(12) United States Patent
Slater, Jr. et al.

(10) Patent No.: US 11,132,414 B2
(45) Date of Patent: Sep. 28, 2021

(54) RELATIONSHIP AND CREDIBILITY BASED EXPERIENCE RATING AND SKILL DISCOVERY SYSTEM

(71) Applicant: Metabyte, Inc., Fremont, CA (US)

(72) Inventors: Lynn Randolph Slater, Jr., Pleasanton, CA (US); Manu Mehta, Fremont, CA (US); Anjali Dayal, Pleasanton, CA (US); Saiba Singh, Pleasanton, CA (US); Nitin Mehta, Fremont, CA (US)

(73) Assignee: METABYTE, INC., Fremont, CA (US)

( * ) Notice: Subject to any disclaimer, the term of this patent is extended or adjusted under 35 U.S.C. 154(b) by 161 days.

(21) Appl. No.: 16/507,020

(22) Filed: Jul. 9, 2019

(65) Prior Publication Data

US 2020/0019576 A1 Jan. 16, 2020

Related U.S. Application Data

(60) Provisional application No. 62/696,327, filed on Jul. 10, 2018.

(51) Int. Cl.
*G06F 16/00* (2019.01)
*G06F 16/9535* (2019.01)
*G06Q 10/10* (2012.01)
*G06F 16/9536* (2019.01)

(52) U.S. Cl.
CPC ...... *G06F 16/9535* (2019.01); *G06F 16/9536* (2019.01); *G06Q 10/1053* (2013.01)

(58) Field of Classification Search
CPC .................. G06F 16/9535; G06F 16/9536
See application file for complete search history.

(56) References Cited

U.S. PATENT DOCUMENTS

| | | |
|---|---|---|
| 2014/0162240 A1 | 6/2014 | Wheeler et al. |
| 2016/0125350 A1 | 5/2016 | Patel |
| 2018/0089734 A1* | 3/2018 | Chen ................ G06Q 10/06398 |
| 2019/0163780 A1* | 5/2019 | Ozcaglar ............ G06F 16/9536 |
| 2019/0236106 A1* | 8/2019 | Zhang ............... G06F 16/90335 |

* cited by examiner

*Primary Examiner* — Hung Q Pham
(74) *Attorney, Agent, or Firm* — Ashok Tankha

(57) ABSTRACT

An experience rating and skill discovery system (ERSDS) and a method for determining credibility of experience ratings provided by one or more reviewers and discovering skills of opportunity seekers based on a relationship between the reviewers and the opportunity seekers are provided. A skill profile module of the ERSDS reads profile data from a user profile list and generates a skills profile list. An invitation module transmits invitations to reviewer devices for providing the experience ratings. An aggregation module aggregates the experience ratings and generates an aggregated experience credibility measure and an aggregated experience plausibility measure, and further an aggregated skill amount measure and an aggregated skill credibility measure corresponding to the experience summaries in an experience summary list and the skills of the opportunity seeker respectively, using a relationship depth computed from the relationship data and the experience ratings received by a user association module and a rating module respectively.

9 Claims, 22 Drawing Sheets

| SKILL OF THE OPPORTUNITY SEEKER | ISTRAIT |
|---|---|
| HTML | FALSE |
| COBOL | FALSE |
| MICROSOFT WORD | FALSE |
| ORACLE DATABASE ADMINISTRATION | FALSE |
| ADOBE ILLUSTRATOR | FALSE |
| PHP | FALSE |
| HAZMAT DRIVER | FALSE |
| ESOPHAGEAL STENT PLACEMENT | FALSE |
| PERCUTANEOUS STONE EXTRACTION | FALSE |
| FIRE FIGHTER II | FALSE |
| CERTIFIED PUBLIC ACCOUNTANT (CPA) | FALSE |
| CERTIFIED FRAUD EXAMINER (CFE) | FALSE |
| HEARTSAVER/FIRST AID INSTRUCTOR | FALSE |
| OSHA FORKLIFT CERTIFICATION | FALSE |
| SELF-MOTIVATED | TRUE |
| ADAPTABILITY | TRUE |
| CONFIDENCE | TRUE |
| PROBLEM SOLVING | TRUE |
| INTERPERSONAL SKILLS | TRUE |
| COLLABORATION | TRUE |
| PROFESSIONALISM | TRUE |
| DEPENDABILITY | TRUE |
| WILLINGNESS TO LEARN | TRUE |
| RESULTS ORIENTED | TRUE |
| INTEGRITY | TRUE |
| ORGANIZATION | TRUE |
| DISCIPLINE | TRUE |
| POSITIVE ATTITUDE | TRUE |
| COMMUNICATION | TRUE |

FIG. 23

| USER_ID | FIRST NAME | LAST NAME | EMAIL ADDRESS |
|---|---|---|---|
| JDOE | JOHN | DOE | jdoe@hotdoodle.com |
| FNERK | FRED | NERK | fnerk@nerkworld.com |
| JBLOGGS | JOE | BLOGGS | joeblg@blogme.com |
| DFELLA | DAT | FELLA | datfella@somebdy.com |
| FNULNU | FNU | LNU | fnulnu@statepenn.com |

FIG. 24

| USER_ID | SKILL OF THE OPPORTUNITY SEEKER | SKILL PROFILE NAME | AMOUNT PRESENT MEASURE | SKILL CREDIBILITY MEASURE |
|---|---|---|---|---|
| FNERK | TUTORING | CLAIM MANAGEMENT | NULL | NULL |
| FNERK | MICROSOFT WORD | CLAIM MANAGEMENT | NULL | NULL |
| FNERK | SELF-MOTIVATED | CLAIM MANAGEMENT | NULL | NULL |
| FNERK | ADAPTABILITY | CLAIM MANAGEMENT | NULL | NULL |
| FNERK | CONFIDENCE | CLAIM MANAGEMENT | NULL | NULL |
| FNERK | PROBLEM SOLVING | CLAIM MANAGEMENT | NULL | NULL |
| FNERK | INTERPERSONAL SKILLS | CLAIM MANAGEMENT | NULL | NULL |
| FNERK | BASIC LAW | LEGAL DOC PREP | NULL | NULL |
| FNERK | MICROSOFT WORD | LEGAL DOC PREP | NULL | NULL |
| FNERK | SELF-MOTIVATED | LEGAL DOC PREP | NULL | NULL |
| FNERK | ADAPTABILITY | LEGAL DOC PREP | NULL | NULL |
| FNERK | CONFIDENCE | LEGAL DOC PREP | NULL | NULL |
| FNERK | PROBLEM SOLVING | LEGAL DOC PREP | NULL | NULL |
| FNERK | INTERPERSONAL SKILLS | LEGAL DOC PREP | NULL | NULL |

FIG. 25

| EXP_ID | USER_ID | START DATE | END DATE | SKILL PROFILE NAME | EXPERIENCE SUMMARY DATA ELEMENT | EXPERIENCE PLAUSIBILITY MEASURE | EXPERIENCE CREDIBILITY MEASURE |
|---|---|---|---|---|---|---|---|
| 1 | FNERK | 6/1/2014 | 12/24/2014 | CLAIM MANAGEMENT | CLAIM MANAGEMENT INTERN<br>T.Y.K.E.S. RESOURCE CENTER, CHINO, CA<br>• ASSESS NEED AND RECOMMEND SERVICES FOR DIVERSE FAMILIES WITH CHILDREN BIRTH TO FIVE YEARS OF AGE<br>• CO-LEAD THE FACILITATION OF COURT MANDATED PARENTING CLASSES | NULL | NULL |
| 2 | FNERK | 6/1/2013 | 8/30/2013 | | PALS PROGRAM<br>HUMAN SERVICES DEPARTMENT, ANAHEIM, CA<br>SKILLS AMONG DIVERSE ADOLESCENTS<br>• DELIVERED ONE-ON-ONE MENTORING TO AT RISK AND TROUBLED TEENS<br>• PROVIDED TUTORING IN MATH, SCIENCE, AND WRITING TO HIGH SCHOOL AGE STUDENTS | NULL | NULL |
| 3 | FNULNU | 4/1/2005 | 11/1/2009 | | BIGBANK, SAN FRANCISCO<br>QUALITY ASSURANCE<br>COORDINATOR/INTERNAL AUDITOR<br>COMPLETED COMMERCIAL, RETAIL AND INDUSTRIAL AUDITS AS LEAD AUDITOR AND ASSISTED ON RESIDENTIAL PROPERTY AUDITS. | NULL | NULL |
| 4 | FNULNU | 2/1/2002 | 4/1/2005 | NULL | ALPHA REALTY TRUST, LOS ANGELES<br>SENIOR PROPERTY ACCOUNTANT<br>PREPARED MONTHLY FINANCIAL STATEMENT PACKAGES FOR CENTRAL BUSINESS DISTRICT AND SUBURBAN OFFICE COMMERCIAL PROPERTIES. | NULL | NULL |

| REL_ID | RATED USER_ID | RATING USER_ID | EXP_ID | REVIEWER PLAUSIBILITY MEASURE | RELATIONSHIP DEPTH | REVIEWER CREDIBILITY MEASURE |
|---|---|---|---|---|---|---|
| 1 | FNERK | DFELLA | 2 | NULL | NULL | NULL |
| 2 | FNULNU | JDOE | 3 | NULL | NULL | NULL |
| 3 | FNULNU | JDOE | 3 | NULL | NULL | NULL |

| REL_ID | SKILL OF THE OPPORTUNITY SEEKER | AMOUNT PRESENT MEASURE | STRENGTH OF BELIEF MEASURE | RELATIONSHIP DEPTH | RATING CREDIBILITY MEASURE |
|---|---|---|---|---|---|
| 1 | TUTORING | NULL | NULL | NULL | NULL |
| 1 | MICROSOFT WORD | NULL | NULL | NULL | NULL |
| 1 | SELF-MOTIVATED | NULL | NULL | NULL | NULL |
| 1 | ADAPTABILITY | NULL | NULL | NULL | NULL |
| 1 | CONFIDENCE | NULL | NULL | NULL | NULL |
| 1 | PROBLEM SOLVING | NULL | NULL | NULL | NULL |
| 1 | INTERPERSONAL SKILLS | NULL | NULL | NULL | NULL |
| 1 | COLLABORATION | NULL | NULL | NULL | NULL |
| 1 | PROFESSIONALISM | NULL | NULL | NULL | NULL |
| 1 | DEPENDABILITY | NULL | NULL | NULL | NULL |
| 1 | WILLINGNESS TO LEARN | NULL | NULL | NULL | NULL |
| 1 | RESULTS ORIENTED | NULL | NULL | NULL | NULL |
| 1 | INTEGRITY | NULL | NULL | NULL | NULL |
| 1 | ORGANIZATION | NULL | NULL | NULL | NULL |
| 1 | DISCIPLINE | NULL | NULL | NULL | NULL |
| 1 | POSITIVE ATTITUDE | NULL | NULL | NULL | NULL |
| 1 | COMMUNICATION | NULL | NULL | NULL | NULL |

| USER ID | FIRST NAME | LAST NAME | EMAIL ADDRESS |
|---|---|---|---|
| FNERK | FRED | NERK | fnerk@nerkworld.com |

| EXP_ID | USER_ID | START DATE | END DATE | SKILL PROFILE NAME | EXPERIENCE SUMMARY DATA ELEMENT | EXPERIENCE PLAUSIBILITY MEASURE | EXPERIENCE CREDIBILITY MEASURE |
|---|---|---|---|---|---|---|---|
| 1 | FNERK | 6/1/2017 | 12/24/2017 | NULL | CLAIM MANAGEMENT INTERN<br>T.Y.K.E.S. RESOURCE CENTER, CHINO, CA<br>• ASSESS NEED AND RECOMMEND SERVICES FOR DIVERSE FAMILIES WITH CHILDREN BIRTH TO FIVE YEARS OF AGE<br>• CO-LEAD THE FACILITATION OF COURT MANDATED PARENTING CLASSES | NULL | NULL |

802

RELATIONSHIP AND CREDIBILITY BASED EXPERIENCE RATING AND SKILL DISCOVERY SYSTEM

CROSS-REFERENCE TO RELATED APPLICATIONS

This application claims priority to and the benefit of the non-provisional patent application No. 62/696,327, titled "Relationship and Credibility Based Experience Rating and Skill Discovery System", filed in United States Patent and Trademark Office on Jul. 10, 2018. The specification of the above referenced patent application is incorporated herein by reference in its entirety.

BACKGROUND

Businesses that provide services to match opportunity seekers or candidates to opportunities, for example, job openings, need to build an objective method to assess the skill level of candidates. Most existing methods that require a candidate to indicate his/her skills are subject to error and/or deliberate misrepresentation. Often, experience summaries of the candidates for the opportunities overstate their qualifications and are not a reliable indicia of the experience, skills, and accomplishments of the candidate. Submitting resumes is the most widely accepted first step for an opportunity, for example, a job opening, and thus, the resumes act as a source for the experience summaries. Online career platforms also allow individuals to manually input their experience summaries and skills. Experience summaries often provide an inaccurate view of the experience of the opportunity seekers. However, the credibility of the candiadte's qualifications cannot be assessed from experience summaries alone, and related documentation such as a full resume of the opportunity seeker most often fails to establish credibility of the candidate's qualifications. An accurate appraisal of the credibility of a job candidate's experience summary would allow, for example, a hiring manager, to make better judgments during the hiring process, for example, to determine which job candidates to bring in for a job interview. Therefore, there is a need for accessing the credibility of the experience summaries provided by a job candidate prior to the hiring process.

One reason to consider experience summaries as a qualification criterion for an opportunity is to determine if certain desired attributes, for example, skills or traits required for the job are possessed by the candidate as recited in the candidate's experience summary. Consider an example of a prospective employer that needs candidates with skills in hypertext preprocessor (PHP) programming language. The prospective employer examines the experience summary of the candidate to determine whether the PHP programming language was used by the candidate at his or her job. If there was a clear association between the experience summaries and the skills used by the candidate at his employment, the computer implemented searches performed by online career platforms will identify candidates with the experience and skills required. Therefore, there is a need for identifying skills and traits of the candidates associated with the claims of the candidate as recited in the candidate's experience summary.

Experience summaries often comprise skills and traits of the opportunity seekers that is difficult for computerized systems, for example, online career platforms to identify. The skills in the experience summary may not use any known keywords associated with a skill, and although many existing technologies, for example, parsing and natural language processing, yield a data structure, these technologies still do not contain associations of the skills with the claims of the experience summaries that a person would likely determine. Consider an example where a skill in the experience summary of a developer at Company X is associated to the skills in the hypertext preprocessor (PHP) programming language, the Apache web server, and website development, and to a trait such as being "results oriented". However, existing technologies are not capable of determining the association of the claimed skill in the experience summary to the skills and traits of the opportunity seekers. Therefore, there is a need for discovering skills and traits associated with the claims of the experience summaries without reliance on computer analysis of text of the claims of the experience summaries.

One way to verify claimed skills in the experience summaries and skills of the opportunity seekers is to obtain opinions of other people, that is, reviewers who have a reasonable basis to know about the job experience, the skills used, and the traits claimed in the experience summary of the opportunity seekers. Therefore, there is a need for identifying reviewers who have a reasonable basis to know about the job experience, the skills used, and the traits present in a job experience described by an experience summary. Furthermore, there is a need for collecting opinions from these identified reviewers about the job experience, the skills used, and the traits present in the job experience in the experience summary submitted by a job seeker. A source of information is reviewers who have a reasonable basis to know about the job experience, the skills used, and the traits present in a job experience described in an experience summary of an an opportunity seeker who submitted the experience summary. Therefore, there is a need for identitifying one or more reviewers who have a reasonable basis to know about the job experience, the skills used, and the traits present in a job experience described in an experience summary provided by the opportunity seeker.

An opportunity seeker asserting that a reviewer has a reasonable basis to know about a claimed skill in the experience summaries does not mean that the reasonable basis actually exists. One premise for a reasonable basis is if the two users, that is, the opportunity seeker and the reviewer had a working relationship with each other relating to the job experience described in the experience summary. Working relationships can vary in depth of knowledge of the experience summary, for example, seeing each other in the kitchen as compared to co-developing a product. The deeper the knowledge of an experience summary, the more credible is the opinion related to the experience summary. Therefore, there is a need for discovering the working relationship between the opportunity seeker providing the experience summary and the reviewers providing opinions about the job seeker's experience summary. Moreover, there is a need for discovering the depth of knowledge of the working relationship between the opportunity seeker and the reviewers. Furthermore, there is a need for using the depth of knowledge of the job experience as a factor when calculating the credibility of the opinions about the experience summary, the skills used, and the traits present in the job experience.

Opinions provided by the reviewers about the experience summaries, the skills used on the job, and the traits present in a specific job experience submitted by a jpb seeker in an experience summary are subjective and may be influenced by biases and errors, for example, where a personal friendship exists between the reviewer and the opportunity seeker, the reviewer may give a high score to the claimed skill in the experience summary of the opportunity seeker. Therefore, there is a need for evaluating the credibility of opinions provided by the reviewers regarding the experience summary, the skills used, and the traits present in the job experience provided in the experience summary. Using reviews of the experience summaries from more than one reviewer reviewers is a way to reduce the effect of bias from the reviewers submitting their opinions. The opinions from one or more reviewers may differ in ratings assigned and in the credibility of the ratings. Therefore, there is a need for collecting the opinions from multiple reviewers about the experience summary, the skills used, and the traits present in a job experience described in an experience summary. However, for the opinions of one or more reviewers to be most effectively used for selecting a suitable opportunity seeker, a single rating is needed for each skill and experience summary of the opportunity seeker, even when there are multiple ratings from different reviewers. However, not all ratings are equally credible. Therefore, there is a need for aggregating the ratings of an experience summary into a single score and for aggregating the ratings about each of the skills and the traits into a single rating per skill and trait, along with considering the credibility of the ratings provided by the reviewers as a weighing factor.

Hence, there is a long felt but unresolved need for a system and a method for determining credibility of experience ratings provided by one or more reviewers and discovering skills of opportunity seekers based on a relationship between the reviewers and the opportunity seekers.

SUMMARY OF THE INVENTION

This summary is provided to introduce a selection of concepts in a simplified form that are further disclosed in the detailed description of the invention. This summary is not intended to determine the scope of the claimed subject matter.

The experience rating and skill discovery system (ERSDS) and the method disclosed herein address the above recited needs for determining the credibility of experience ratings provided by one or more reviewers, and for discovering skills of opportunity seekers based on a relationship between the reviewers and the opportunity seekers. A user, for example, an opportunity seeker via seeker devices, selects an experience summary data set in an experience summary list to be rated and associates the experience summary data set with a skills profile list, creating a skill profile first if needed. The opportunity seeker further invites any number of reviewers to evaluate the experience summary data set for overall plausibility and rate the skills in the skills profile list of the opportunity seeker. The reviewers who choose to rate the experience summary data sets and the skills of the opportunity seekers use a graphical user interface, for example, web screens to enter the ratings corresponding to the experience summary data sets and the skills of the opportunity seeker. A relationship measurement module external to the ERSDS computes a relationship depth of the relationship between the opportunity seeker and the reviewer. A credibility module of an operational system external to the ERSDS computes rating credibility measures indicating credibility of the ratings from the reviewers. At various times, possibly after every review by the reviewers, possibly as a batch runs, or possibly on demand, an aggregation process is run on the ratings of the experience summary data sets and the skills of the opportunity seeker by the ERSDS and an aggregated experience plausibility measure and an aggregated experience credibility measure are assigned as a score corresponding to the experience summary data set, and an aggregated skill amount measure and an aggregated skill credibility measure are assigned as a score corresponding to each of the skills of the opportunity seeker associated with a skill profile.

The aggregated experience plausibility measure and the aggregated experience credibility measure establish accuracy of the experience summary data sets. The skills associated with the skill profile that have a large skill amount measure of sufficient credibility act as an identification of the domains of expertise and personal traits associated with the experience summary. No computer analysis of the text of claims of experience summaries is needed to discover the skills associated with the claims of the experience summaries. The experience rating and skill discovery system (ERSDS) enables an opportunity seeker, also referred to as a "rated user", to supply information on the reviewers who knew of an experience, for example, a job experience of the opportunity seeker via invitations. The invitations fulfill the need to discover reviewers who have a reasonable basis to know about the experience and the skills used in an experience described by an experience summary. Furthermore, the ERSDS collects opinions from the invited reviewers about the experience, the skills used, and the personal traits present in an experience described by an experience summary. By means of the invitations, the ERSDS collects from the rated user providing the experience summary, the identities of the reviewers who have a reasonable basis to know about the experience and the skills used in an experience described by an experience summary.

The experience rating and skill discovery system (ERSDS) collects ratings from the discovered reviewers, thereby fulfilling the need to collect opinions about the experience summaries and the skills present in a specific experience described by an experience summary. Furthermore, multiple reviewers submit ratings about the skills and the experience summary, thereby fulfilling the need to collect the opinions from multiple parties about the experience summary and the skills present in an experience described by an experience summary. A user association module of the ERSDS collects relationship data comprising, for example, information about a working relationship between the opportunity seeker and the reviewer, thereby fulfilling the need to discover the working relationship between the opportunity seeker providing the experience summary and those reviewers providing opinions about the experience summary. The relationship measurement module external to the ERSDS and invoked by the ERSDS fulfills the need to discover the depth of knowledge of the working relationship, that is, a relationship depth of the relationships between the opportunity seeker and the reviewers. The credibility module external to the ERSDS and invoked by the ERSDS runs reviews through the ratings provided by the reviewers, thereby fulfilling the need to evaluate the credibility of opinions about the experience summary and the skills present in an experience described by the experience summary. The credibility module has access to the relationship depth, thereby fulfilling the need to use the depth of knowledge of the experience as a factor when calculating the credibility of the opinions about the experience summary and the skills used in the experience. An aggregation module of the ERSDS produces single ratings from multiple ratings, that is, aggregates ratings of the experience summary data sets and the skills and generates an aggregated experience plausibility measure and an aggregated experience credibility measure, and for each skill or personal trait in a skill profile, generates an aggregated skill amount measure and an aggregated skill credibility measure.

The aggregation module uses credibility of the ratings to affect the impact of each individual rating for each skill in the skill profile, thereby fulfilling the need to aggregate the ratings of an experience summary into a single score and to aggregate the ratings about each skill into a single rating per skill using credibility of the opinions as a factor in the process of aggregation. The skills with corresponding aggregated skill amount measures and aggregated skill credibility measures are used by another operational system of an entity for determining a degree of match between the skills with the corresponding aggregated skill amount measures and the aggregated skill credibility measures and opportunity description skills of varying importance in opportunity descriptions. The experience summary data set with a corresponding aggregated experience plausibility measure and an aggregated experience credibility measure are used by another operational system of the entity for recommending which experience summary data sets are worth consideration when reviewing an opportunity seeker. The relationship measurement module and the credibility module examine all records related to either the opportunity seeker or the invited reviewer. The rating module in communication with the relationship measurement module, for example, poses questions about the relationship of the invited reviewers with other invited reviewers. The credibility module notices that the invited reviewer gives implausibly high scores in reviews of other opportunity seekers and can use that as a factor in determining credibility of the ratings provided by the reviewers. The credibility module also takes into account scores provided from a first time reviewer versus a repeated reviewer for determining the credibility of the ratings provided by the reviewers.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific methods and components disclosed herein.

FIG. 23 exemplarily illustrates a predefined skill list comprising skills classified into personal traits and domains of expertise.

FIG. 24 exemplarily illustrates a user profile list comprising profile data of users of the experience rating and skill discovery system.

FIG. 25 exemplarily illustrates a skills profile list generated by the skill profile module using the profile data in the user profile list exemplarily illustrated in FIG. 24 and the skills in the predefined skill list exemplarily illustrated in FIG. 23.

FIG. 26 exemplarily illustrates an experience summary list received by the user association module.

FIG. 27 exemplarily illustrates a relationship list comprising relationship data, a reviewer plausibility measure, and a reviewer credibility measure of each of the experience summary data sets listed in the experience summary list exemplarily illustrated in FIG. 26.

FIG. 28 exemplarily illustrates a ratings list comprising ratings and relationship depths corresponding to the skills, generated by the relationship measurement module.

FIG. 29 exemplarily illustrates a user profile list comprising profile data of at least one user, stored in a database of the experience rating and skill discovery system.

FIG. 30 exemplarily illustrates an experience summary list comprising at least one experience summary data set, stored in a database of the experience rating and skill discovery system.

DETAILED DESCRIPTION OF THE INVENTION

Figure 1:
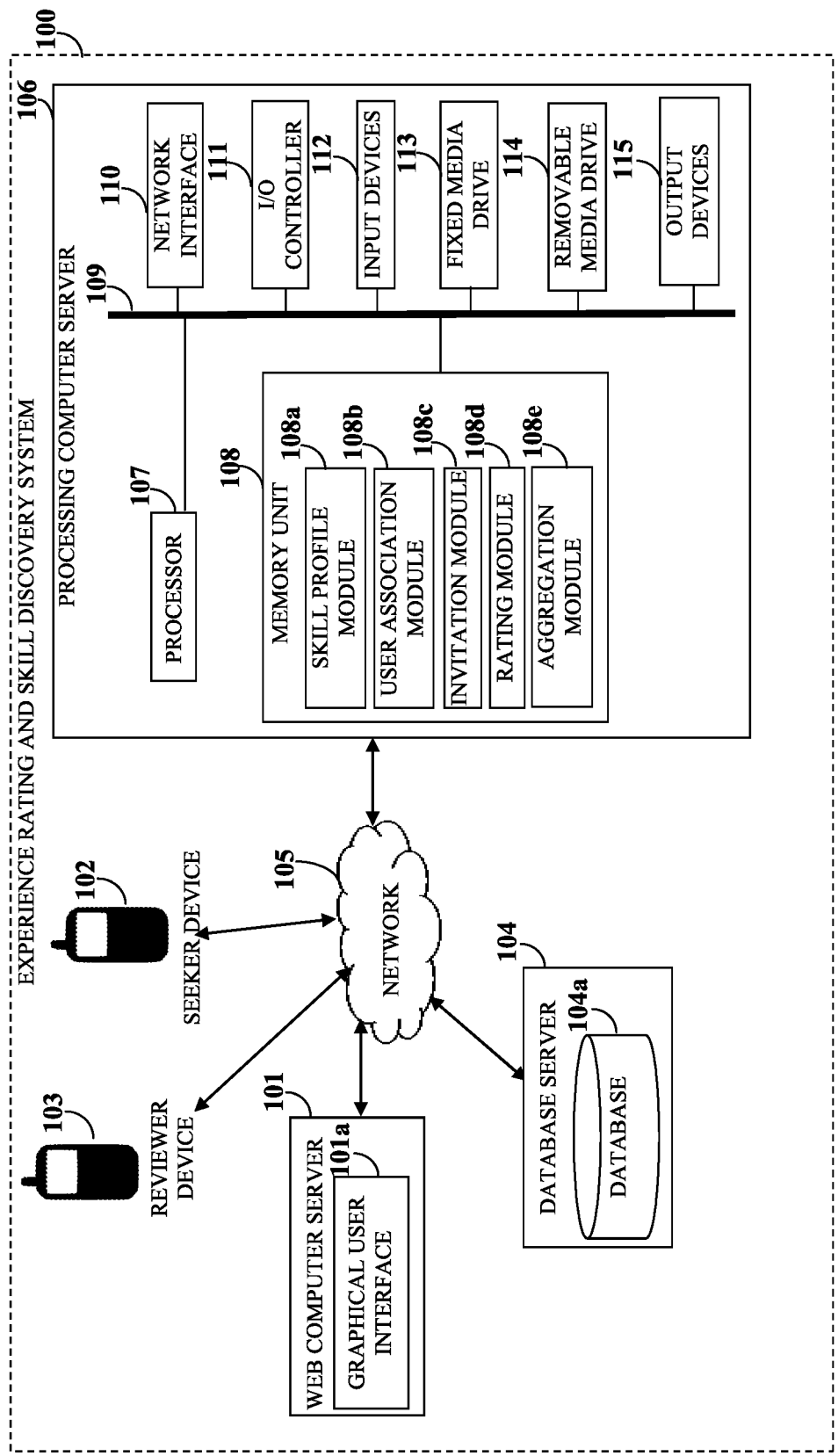
FIG. 1 exemplarily illustrates an experience rating and skill discovery system (ERSDS) incorporating a computer system architecture for using a relationship between one or more reviewers and opportunity seekers as a factor in determining credibility of experience ratings provided by one or more reviewers and discovering skills of opportunity seekers from the experience ratings provided by the reviewers.

FIG. 1 exemplarily illustrates an experience rating and skill discovery system (ERSDS) 100 incorporating a computer system architecture for using a relationship between one or more reviewers and opportunity seekers as a factor in determining credibility of experience ratings provided by one or more reviewers and discovering skills of opportunity seekers from the experience ratings provided by the reviewers. As used herein, "skill" refers to an expertise of an opportunity seeker in a particular domain for carrying out an opportunity smoothly and efficiently. The skills of the opportunity seeker comprise, for example, personal traits and/or domains of expertise of the opportunity seeker. As used herein, "personal traits" refer to distinguishing qualities of the opportunity seekers. The personal traits comprise, for example, dependability, integrity, confidence, etc. A reviewer is an individual who reviews and provides experience ratings to an experience summary provided by the opportunity seeker for an opportunity in an entity, for example, a company or an organization. The experience summary of the opportunity seeker is a summary or a gist of relevant past experiences, for example, job experiences, of the opportunity seeker in different opportunities, for example, job roles. Also, as used herein, "experience ratings" refer to quantized values assigned by reviewers to experience summaries provided by opportunity seekers on assessment of the experience summaries. The relationship between a reviewer and an opportunity seeker is, for example, a relationship between a manager and a subordinate, a relationship between co-workers, etc. The details of the relationship result in a relationship depth score that is a factor in the credibility given to the experience ratings provided by the reviewers. "Experience ratings" is not limited to a hiring industry, but is applicable to numerous industries ranging, for example, professional services for example services provided by doctors, lawyers, etc., restaurants, any service provided by a service provider, a product, etc.

The experience rating and skill discovery system (ERSDS) 100 is implemented as a software as a service, for example, a hiring platform as a service (HPaaS). In an embodiment, the ERSDS 100 is implemented, for example, as a rating platform as a service (RPaaS). In an embodiment, the ERSDS 100 is configured as a web based platform, for example, a website hosted on a server or a network of servers. A list of skills possessed by opportunity seekers and experience ratings allow discovery of the skills associated with an experience summary. Based on the skills entered by the opportunity seeker and the experience ratings provided by the reviewers, the ERSDS 100 discovers skills of the opportunity seekers from the experience summary provided by the opportunity seekers. The skills provided by the opportunity seekers as a part of a skills profile list 303 exemplarily illustrated in FIG. 25, comprise personal traits and domains of expertise of the opportunity seekers. The personal traits are flagged using an "ISTRAIT" flag in a predefined skill list 302 exemplarily illustrated in FIG. 23.

The experience rating and skill discovery system (ERSDS) 100 comprises at least one web computer server 101, at least one database server 104, and at least one processing computer server 106. The web computer server 101 renders graphical user interfaces 101a to multiple seeker devices 102 and multiple reviewer devices 103. As used herein, "seeker devices" and "reviewer devices" are user devices, for example, personal computers, laptops, tablet computing devices, smart phones, mobile computers, personal digital assistants, touch centric devices, workstations, client devices, portable electronic devices, network enabled computing devices, interactive network enabled communication devices, etc., possessed by the opportunity seekers and the reviewers respectively, for interacting with the ERSDS 100. In an embodiment, the seeker devices 102 and reviewer devices 103 are hybrid computing devices that combine the functionality of multiple devices. Examples of a hybrid computing device comprise a cellular telephone that includes a media player functionality, a gaming device that includes a wireless communications capability, a cellular telephone that includes a document reader and multimedia functions, and a portable device that has network browsing, document rendering, and network communication capabilities. For purposes of illustration, the seeker devices 102 and reviewer devices 103 are user devices of a recruitment system of entities such as offices, educational institutes, etc. The database server 104 is communicatively coupled to the web computer server 101 via a network 105, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In an embodiment, the experience rating and skill discovery system 100 is accessible to the satellite internet of users, for example, through a broad spectrum of technologies and devices such as cellular phones, tablet computing devices, etc., with access to the internet.

The database server 104 hosts one or more databases 104a for storing a user profile list 301 exemplarily illustrated in FIG. 24, the skills profile list 303 exemplarily illustrated in FIG. 25, a predefined skill list 302 exemplarily illustrated in FIG. 23, an experience summary list 802 exemplarily illustrated in FIG. 26, a relationship list 801 exemplarily illustrated in FIG. 27, and a ratings list 803 exemplarily illustrated in FIG. 28. The processing computer server 106 comprises at least one processor 107 communicatively coupled to the web computer server 101, the database server 104, the seeker devices 102, and the reviewer devices 103 via the network 105. The processor 107 executes computer program instructions defined by modules of the experience rating and skill discovery system (ERSDS) 100. The modules of the ERSDS 100 comprise a skill profile module 108a, a user association module 108b, an invitation module 108c, a rating module 108d, and an aggregation module 108e. The modules external to the ERSDS 100 and invoked by the ERSDS 100 comprise a relationship measurement module 239 exemplarily illustrated in FIG. 15, a credibility module 240 exemplarily illustrated in FIG. 16, and a hash module (not shown). The processing computer server 106 further comprises a non-transitory computer readable storage medium having embodied thereon, computer program codes comprising instructions executable by the at least one processor 107 for determining the credibility of experience ratings provided by the one or more reviewers and discovering skills of the opportunity seekers based on the relationship between the reviewers and the opportunity seekers.

The skill profile module 108a of the experience rating and skill discovery system (ERSDS) 100 reads profile data of the opportunity seekers that is stored in the user profile list 301 exemplarily illustrated in FIG. 24. As used herein, "profile data" refers to identification information of the opportunity seekers and the reviewers who use the ERSDS 100. The profile data comprises, for example, unique user identifiers (IDs), first names, last names, and electronic mail (email) address. The skill profile module 108a generates the skills profile list 303 exemplarily illustrated in FIG. 25, comprising skill profiles associated with the opportunity seekers, using the stored profile data of the opportunity seekers and the skills selected from the predefined skill list 302 exemplarily illustrated in FIG. 23, via the seeker devices 102. The skill profiles comprise skills of the opportunity seeker with corresponding skill amount measures and corresponding skill credibility measures indicating credibility of the skill amount measures. As used herein, "skill profile" refers to an entry or a subset of the skills profile list 303 identified by a user identifier, that is, USER_ID of the opportunity seeker and a skill profile name. The USER_ID and the skill profile name form a unique key in the skills profile list 303. The skills in the skills profile list 303 associated with the opportunity seekers are identified by a skill profile name and have corresponding skill amount measures and corresponding skill credibility measures indicating credibility of the skill amount measures. In a skill profile, each of the skills associated with an opportunity seeker occurs at most once with a corresponding skill amount measure and a corresponding skill credibility measure. The skill amount measure will be NULL and the skill credibility measure will be NULL for each of the selected skills when a skill profile in the skills profile list 303 is generated by the skill profile module 108a. The values for the skill amount measure and the skill credibility measure for a skill are obtained and filled in the skill profile as an aggregation of the skill amount measures and the skill credibility measures entered by reviewers on evaluating the skills associated with the opportunity seekers.

As used herein, a "skill amount measure" is a quantized value of proficiency of an opportunity seeker in a skill. The skill amount measure is a numerical value between 0 and 1, both inclusive and NULL. The skill amount measure represents the degree to which a skill is present. A value of 1 for the skill amount measure indicates that the skill is present to a maximum level possible, that is, the opportunity seeker is highly proficient in the skill. A value of 0 for the skill amount measure indicates that the skill is not present, that is, the opportunity seeker does not possess the skill. A value of NULL for the skill amount measure indicates that the skill is not known. The skill amount measure is a fraction of a total skill amount measure of the skills possessed by the opportunity seekers. Also, as used herein, "skill credibility measure" refers to a numerical value between 0 and 1, both inclusive and NULL. The skill credibility measure represents the probability of the skill amount measure being accurate. The predefined skill list 302 exemplarily illustrated in FIG. 23, comprises opportunity seekers skills classified into personal traits and domains of expertise. The skills in the predefined skill list 302 are represented as non-null strings and flagged using an "ISTRAIT" flag. The ISTRAIT flag is a non-NULL Boolean. The skills of the opportunity seeker in the skill profile are selected from the predefined skill list 302 by the opportunity seekers via the seeker devices 102.

The user association module 108b of the experience rating and skill discovery system (ERSDS) 100 receives the experience summary list 802 exemplarily illustrated in FIG. 26, from the database server 104. The experience summary list 802 comprises experience summary data elements in the skill profiles listed in the skills profile list 303 exemplarily illustrated in FIG. 25, of the opportunity seekers identified by a USER_ID, with corresponding experience plausibility measures and corresponding experience credibility measures. An experience summary data element, a USER_ID in the skill profile, a start date of the experience summary data element START_DATE, an end date of the experience summary data element END_DATE, an experience plausibility measure, and an experience credibility measure corresponding to the experience summary data element constitute an "experience summary data set". The experience summary data sets are entries in the experience summary list 802. An experience summary data set is associated with a skill profile. In an embodiment, the same skill profile is associated with multiple experience summary data sets, if an opportunity seeker changes entities while doing the same work or job. The user association module 108b selects an experience summary data set from the experience summary list 802 and creates a record in the relationship list 801 exemplarily illustrated in FIG. 27, with a corresponding experience identifier, for example, EXP_ID from the experience summary data set. The experience summary data set is identified by the EXP_ID in the experience summary list 802. If a skill profile name in the experience summary data set is missing, the user association module 108b assigns a skill profile name as disclosed in the detailed description of FIG. 7. The selected experience summary data set comprises a skill profile name. The experience summary data element in an experience summary data set represents responsibilities performed by opportunity seekers in a skill profile over a duration of time. A responsibility performed by an opportunity seeker is represented by a string describing, for example, a job related experience in a past entity such as a company, listing core tasks performed as a part of the job related experience.

Also, as used herein, "experience plausibility measure" refers to a numerical value representing the amount of accuracy of the experience summary data set. The experience plausibility measure is a numerical value between 0 and 1, both inclusive and NULL. A value of 1 for the experience plausibility measure represents an experience summary data element and the associated dates to be totally accurate. A value of 0 for the experience plausibility measure represents an experience summary data element and the associated dates to be entirely fictitious. The experience credibility measure represents the probability of the experience plausibility measure being accurate. The experience credibility measure is a numerical value between 0 and 1, both inclusive and NULL.

The invitation module 108c of the experience rating and skill discovery system (ERSDS) 100, invoked by the user association module 108b, transmits invitations comprising a uniform resource locator (URL) link, to the reviewer devices 103 for evaluating the experience summary data elements in the received experience summary list 802 exemplarily illustrated in FIG. 26, and the skills of the opportunity seeker in the generated skills profile list 303 exemplarily illustrated in FIG. 25. The evaluation of the experience summary data elements and the skills allows the reviewers to discover the skills possessed by an opportunity seeker in a skill profile associated with the experience summary data elements in the experience summary list 802. The hash module external to the ERSDS 100, in communication with the user association module 108b and the invitation module 108c, generates authentication credentials and the URL link comprising a hash for the graphical user interface 101a to be rendered on the reviewer devices 103 of the reviewers. Using the invitations, the reviewers evaluate the experience summary data sets and award ratings to each of the skills associated with the experience summary data elements in a skill profile.

The user association module 108b determines whether profile data of the reviewers with the transmitted invitations is available in the user profile list 301. If the profile data is unavailable, the user association module 108b receives and stores unavailable profile data of the reviewers in the user profile list 301. In an embodiment, the user association module 108b receives profile data of a reviewer from an opportunity seeker, determines whether the profile data of the reviewer is available in the user profile list 301, and stores unavailable profile data of the reviewer in the user profile list 301. The opportunity seekers invoke the user association module 108b by providing the profile data of a reviewer from whom the opportunity seeker wants a review. The invitation module, in communication with the user association module 108b, transmits an invitation to the reviewer device of the reviewer. The reviewer, also referred herein as the "rating user", is a human identified by a USER_ID in the user profile list 301 exemplarily illustrated in FIG. 24. In the relationship list 801 exemplarily illustrated in FIG. 27, the USER_ID of an opportunity seeker, also referred herein as the "rated user", is stored, for example, as RATED_USER_ID, and the USER_ID of the rating user is stored, for example, as RATING_USER_ID indicating one user of the experience rating and skill discovery system (ERSDS) 100 can rate another user. In an embodiment, an entry in the relationship list 801 need not necessarily indicate that an invitation is transmitted to the rating user from the rated user by the invitation module. In this embodiment, the rating user finds out by other means, for example, by already being a user of the ERSDS, from the graphical user interfaces 101a of the reviewer devices 103, etc. For every skill in the skill profile associated with the rated user with a RATED_USER_ID in the relationship list 801, there exists a corresponding row in the ratings list 803 exemplarily illustrated in FIG. 28, with a relationship identifier, for example, REL_ID, from the relationship list 801 and the skill. In an embodiment, the user association module 108b prompts the reviewer to review an opportunity seeker that the reviewer recognizes by questions, for example, "Hey, you are reviewing Joe who worked at Amazon. Did you also know Xudong?" from a list of "other coworkers you might know" or "Who else knew Joe?". Such prompting by the user association module 108b, in an embodiment, causes invitations to be sent to the reviewer.

The user association module 108b stores an association between each of the opportunity seekers and each of the reviewers as relationship data in the relationship list 801. The information of the relationships between the reviewers and the opportunity seekers is indicated using the USER_ID of the opportunity seeker, that is, RATED_USER_ID, the USER_ID of the reviewer, that is, RATING_USER_ID, and the EXP_ID of the experience summary data set being evaluated by the reviewer. The user association module 108b configures a reviewer plausibility measure corresponding to each experience summary data set in the relationship list 801 to NULL. As used herein, "reviewer plausibility measure" refers to a numerical value representing the amount of accuracy of the experience summary data element as estimated by a reviewer. The reviewer plausibility measure is a numerical value between 0 and 1, both inclusive and NULL. A value of 1 of the reviewer plausibility measure represents an experience summary data set to be totally accurate. A value of 0 of the reviewer plausibility measure represents an experience summary data set to be fictitious. Each record in the relationship list 801 corresponding to a relationship between a reviewer and an opportunity seeker associated with an experience summary data set identified by the EXP_ID is identified using a unique relationship identifier REL_ID. The relationship list 801 comprises a reviewer credibility measure corresponding to each experience summary data set. The reviewer credibility measure represents the probability of the reviewer plausibility measure being accurate. The reviewer credibility measure is also a numerical value between 0 and 1, both inclusive and NULL. The reviewer credibility measure indicates credibility of the reviewer plausibility measure corresponding to each of the experience summary data elements in the skill profiles of the opportunity seekers. The experience summary data set occurs only once in the experience summary list 802 exemplarily illustrated in FIG. 26, as the EXP_ID identifies the experience summary data set. In the relationship list 801, the experience summary data set occurs multiple times.

The user association module 108b of the experience rating and skill discovery system (ERSDS) 100 invokes the relationship measurement module 239 of an operational system of an entity external to the ERSDS 100, for rendering questions related to the relationship between each of the opportunity seekers and each of the reviewers and collects the relationship data. The user association module 108b invokes the relationship measurement module 239 to ask questions and receive responses, for example, "What was your working relationship: He was my manager", to and from the opportunity seeker respectively, when the relationship is created. The user association module 108b does not interact with a reviewer and cannot ask questions to the reviewer. The user association module 108b stores the collected relationship data comprising information of the relationship in the relationship list 801 exemplarily illustrated in FIG. 27.

The rating module 108d receives the reviewer plausibility measure corresponding to each of the experience summary data elements in the skill profiles of the opportunity seekers from the reviewer devices and updates the received reviewer plausibility measure in the relationship list 801. The rating module 108d receives ratings provided by each of the reviewers from the reviewer devices on evaluating the skills associated with the experience summary data elements in the skill profiles. A reviewer in a relationship identified by the REL_ID in the relationship list 801 exemplarily illustrated in FIG. 27, with an opportunity seeker, evaluates the skills associated with a skill profile name from the experience summary data set identified by the EXP_ID. The reviewer awards ratings for each of the skills possessed by the opportunity seeker. The ratings comprise a rating skill amount measure and a strength of belief measure for each of the skills. As used herein, a "rating skill amount measure" refers to a quantized value of proficiency of the opportunity seekers in the skills as assessed by the reviewers. The rating skill amount measure is a non-negative numerical value between 0 and 1 inclusive or NULL. The rating skill amount measure represents the degree to which an skill is present in the opportunity seeker. Also, as used herein, "strength of belief measure" refers to a quantized value indicating probability of the opportunity seeker possessing the skill. The strength of belief measure is also a non-negative numerical value or NULL. The strength of belief is a self-assessment from the reviewer and indicates the difference between, for example, "I know that Joe is an expert in the hypertext preprocessor (PHP) programming language" and "I sort of think that Joe is an expert in the PHP programming language". The reviewers themselves may have no credibility and what they say may have credibility.

The rating module 108d updates the ratings list 803 exemplarily illustrated in FIG. 28, comprising the received ratings and relationship depths corresponding to each of the skills. As exemplarily illustrated in FIG. 28, a reviewer in a relationship identified by the REL_ID with an opportunity seeker associated with an experience summary data set identified by the EXP_ID awards a rating skill amount measure AMOUNT_PRESENT and a strength of belief measure STRENGTH OF BELIEF for each of the skills in performing the experience summary data element in the experience summary data set identified by the EXP_ID. The user association module 108b generates the ratings list 803 and configures the rating skill amount measure and the strength of belief measure for each of the skills in the ratings list 803 to NULL.

The relationship measurement module 239, invoked by the user association module 108b and the rating module 108d, computes the relationship depth of the relationship between each of the reviewers and each of the opportunity seekers using the relationship data associated with each of the skills stored in the relationship list 801 exemplarily illustrated in FIG. 27. As used herein, "relationship depth" refers to a quantized value indicating depth of knowledge possessed by a reviewer about the experience summary data element associated with an opportunity seeker. That is, the relationship depth gauges the quality of interactions between the reviewer and the opportunity seeker in the course of the opportunity seeker having performed the described activities in the experience summary data set. The relationship depth is a non-negative numerical value or NULL. The rating module 108d interacts with the reviewer and asks the reviewer about the relationship with the opportunity seeker before proceeding to receive ratings, for example, as "What was your working relationship: He was a co-worker, I did not manage him". The relationship depth is updated for the relationship in the ratings list 803 exemplarily illustrated in FIG. 28, and the relationship list 801. The relationship measurement module 239 gathers and stores the additional relationship details about the relationship between the reviewer and the opportunity seeker. A generic computer using a generic program cannot compute relationship depth of the relationship between each of the reviewers and each of the opportunity seekers using the relationship data associated with each of the skills as disclosed above.

The rating module 108d of the experience rating and skill discovery system (ERSDS) 100, in communication with the credibility module 240 of the operational system of the entity external to the ERSDS 100, receives the reviewer credibility measure of each of the experience summary data elements in the skill profiles of the opportunity seekers from the credibility module 240. The rating module 108d stores the received reviewer credibility measure in the relationship list 801 exemplarily illustrated in FIG. 27. The credibility module 240 computes the reviewer credibility measure of each of the experience summary data elements. The rating module 108d receives a rating credibility measure of each of the skills from the credibility module 240 and stores each rating credibility measure in the ratings list 803 exemplarily illustrated in FIG. 28. As used herein, "rating credibility measure" refers to a numerical value indicating estimated credibility of the rating skill amount measure corresponding to the skills possessed by the opportunity seekers provided by the reviewers via the reviewer devices to the credibility module 240. The rating credibility measure indicates credibility of the rating skill amount measure of each of the skills. The reviewer credibility measure and the rating credibility measure are not entered by humans and are not received from humans. Prior to receiving ratings, the rating module 108d poses additional questions to the reviewer and the rating module 108d, in communication with the relationship measurement module 239, updates the relationship depth in the ratings list 803 and the relationship list 801. In an embodiment, the rating module 108d does not collect ratings for a particular skill from the reviewers when the relationship depth is lower than a threshold. In another embodiment, the rating module 108d downgrades some skills possessed by the opportunity seekers because the skills did not receive ratings from the reviewers. The credibility module 240 invoked by the rating module 108d computes the rating credibility measure. The rating credibility measure is a non-negative numerical value or NULL. Later on, possibly many days later after a review, that is, after the ratings and the reviewer plausibility measure are entered, the credibility module 240 is invoked, and the credibility module 240 updates the rating credibility measure and the reviewer credibility measure in the ratings list 803 and the relationship list 801 respectively. In an embodiment, the operation of the credibility module 240 is practical by first examining the ratings and the reviewer plausibility measure entered by the reviewers and then using the rating credibility measure and the reviewer credibility measure after the aggregation of the rating skill amount measure and the reviewer plausibility measure by the aggregation module. A generic computer using a generic program cannot compute computes the reviewer credibility measure of each of the experience summary data elements as disclosed above.

The aggregation module 108e of the experience rating and skill discovery system (ERSDS) 100 generates an aggregated experience plausibility measure and an aggregated experience credibility measure corresponding to each of the experience summary data elements in the experience summary list 802 exemplarily illustrated in FIG. 26, from the reviewer plausibility measure and the reviewer credibility measure respectively, corresponding to each of the experience summary data elements associated with the relationship data stored in the relationship list 801 exemplarily illustrated in FIG. 27. As used herein, "aggregated experience plausibility measure" refers to a combined value of the reviewer plausibility measures corresponding to multiple occurrences of an experience summary data set in the relationship list 801. Also, as used herein, "aggregated experience credibility measure" refers to a combined value of the reviewer credibility measures corresponding to multiple occurrences of the experience summary data set in the relationship list 801. The aggregation module 108e also generates an aggregated skill amount measure and an aggregated skill credibility measure corresponding to each of the skills of the opportunity seeker in the skills profile list 303 exemplarily illustrated in FIG. 25, from the rating skill amount measure and the rating credibility measure respectively, corresponding to each of the skills in the ratings list 803 exemplarily illustrated in FIG. 28. As used herein, "aggregated skill amount measure" refers to a combined value of the rating skill amount measures corresponding to multiple occurrences of the skills in the ratings list 803. Also, as used herein, "aggregated skill credibility measure" refers to a combined value of the rating credibility measures corresponding to multiple occurrences of the skills in the ratings list 803.

The aggregation module 108e performs a mathematical rollup of N rating skill amount measures and rating credibility measures into a single aggregated skill amount measure and a single aggregated skill credibility measure respectively. The aggregation module 108e performs a roll up of each of the multiple ratings of the skills in the ratings list 803 exemplarily illustrated in FIG. 28, into an aggregated skill amount measure and an aggregated skill credibility measure respectively, corresponding to a single occurrence of the skill in the skills profile list 303 exemplarily illustrated in FIG. 25. The aggregation module 108e also performs a roll up of the multiple reviewer plausibility measures in the relationship list 801 exemplarily illustrated in FIG. 27, into an aggregated experience plausibility measure corresponding to a single occurrence of an experience summary data element in the experience summary list 802 exemplarily illustrated in FIG. 25. The aggregated experience plausibility measure is similar to the aggregated skill amount measure except that the aggregated experience plausibility measure applies to an experience summary data element.

Figure 18:
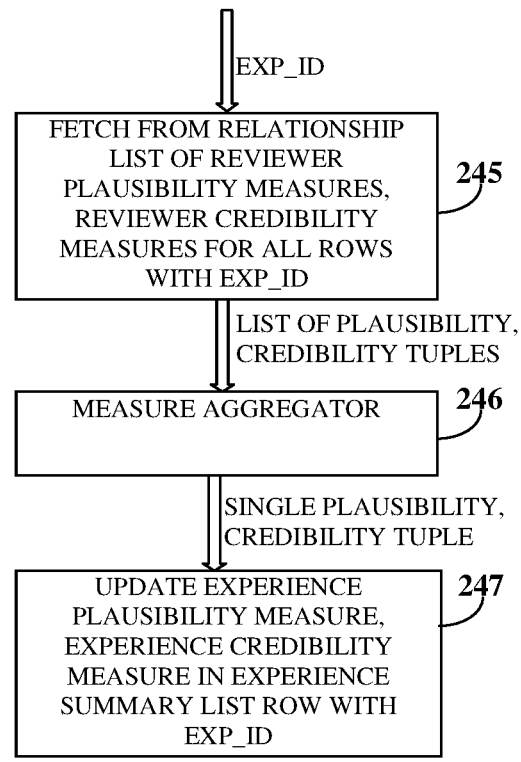
FIG. 18 exemplarily illustrates a flow diagram comprising the steps performed by a measure aggregator invoked by the aggregation module for computing an aggregated experience plausibility measure and an aggregated experience credibility measure for a single experience summary data set.
Figure 19:
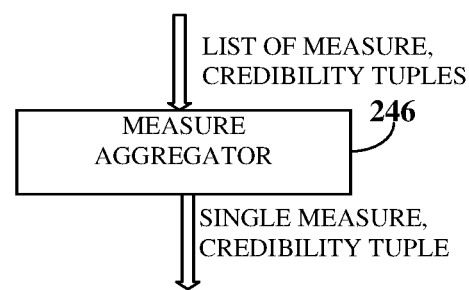
FIG. 19 exemplarily illustrates a flow diagram comprising the steps performed by the measure aggregator for computing an aggregated experience plausibility measure or an aggregated skill amount measure and an aggregated experience credibility measure or an aggregated skill credibility measure.
Figure 20:
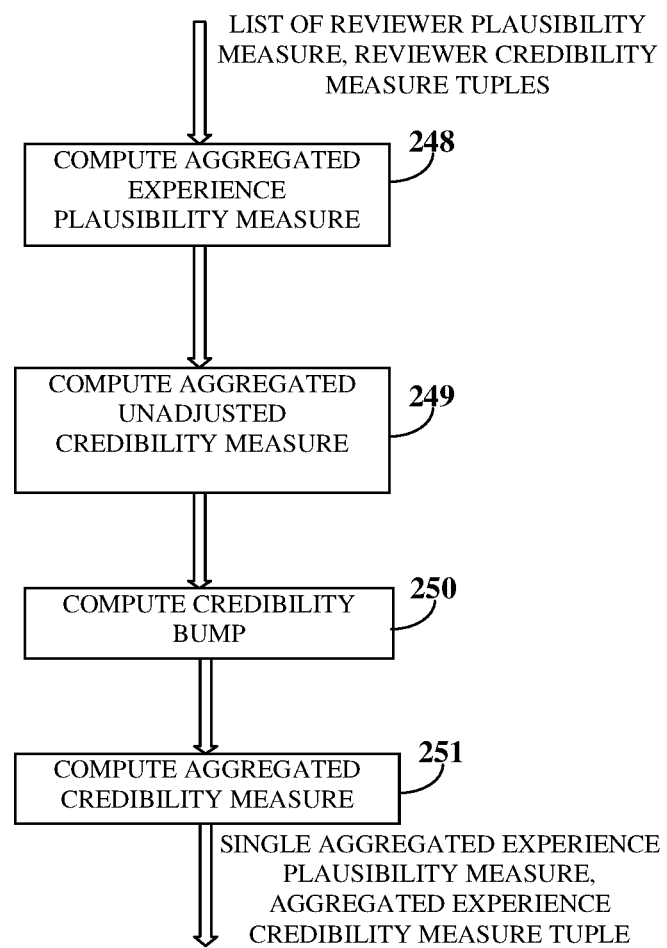
FIG. 20 exemplarily illustrates a flow diagram comprising the steps performed by the measure aggregator for generating the aggregated experience credibility measure and the aggregated experience plausibility measure.
Figure 21:
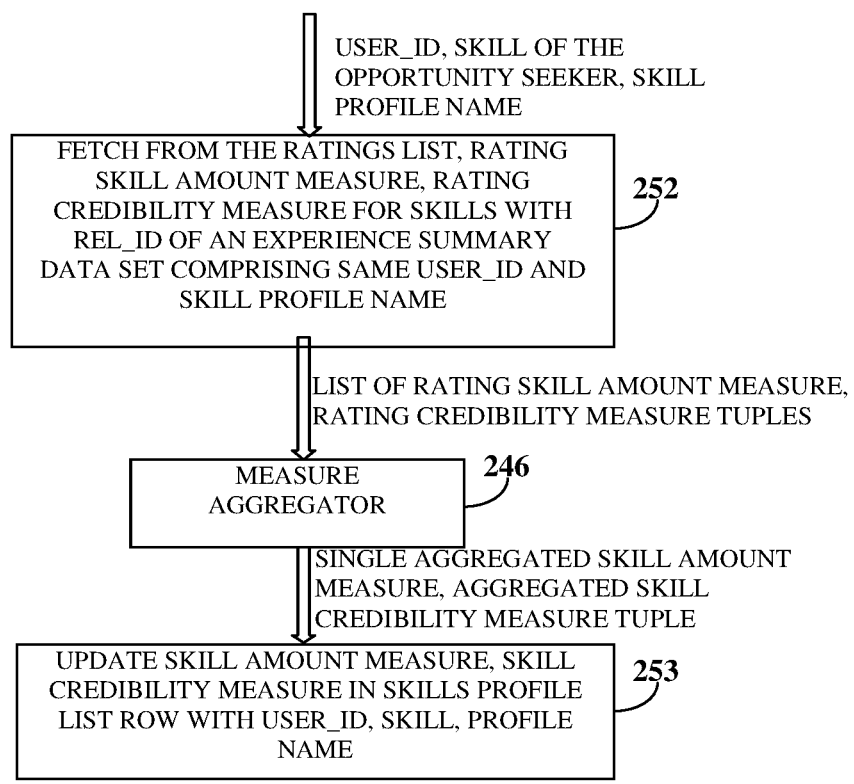
FIG. 21 exemplarily illustrates a flow diagram comprising the steps performed by the aggregation module for computing an aggregated skill amount measure and an aggregated skill credibility measure for a single skill in the skills profile list.

The aggregation module 108e invokes a measure aggregator 246 exemplarily illustrated in FIGS. 18-19 and FIG. 21, for generating the aggregated experience plausibility measure and the aggregated experience credibility measure by computing a weighted credibility measure, an aggregated unadjusted credibility measure, and a credibility bump as disclosed in the detailed description of FIG. 20. The aggregation module 108e stores the results of the measure aggregator 246, that is, the aggregated experience plausibility measure and the aggregated experience credibility measure as the experience plausibility measure and the experience credibility measure respectively, corresponding to each of the experience summary data elements in the experience summary list 802 exemplarily illustrated in FIG. 26.

Similarly, to generate the aggregated skill amount measure and the aggregated skill credibility measure, the aggregation module 108e invokes the measure aggregator 246 for generating a weighted credibility measure, an aggregated unadjusted credibility measure, and a credibility bump as disclosed in the detailed description of FIG. 20. The aggregation module 108e stores the results of the measure aggregator 246, that is, the aggregated skill amount measure and the aggregated skill credibility measure, as the skill amount measure and the skill credibility measure respectively, corresponding to each of the skills in the skills profile list 303 exemplarily illustrated in FIG. 25. The generated aggregated skill credibility measure and the generated aggregated experience credibility measure determine credibility of the ratings about the experience summary data elements and the skills provided by the reviewers on evaluating the experience summary data elements and the skills associated with each of the opportunity seekers. The computed relationship depth is a factor in computing the aggregated experience credibility measure corresponding to each of the experience summary data elements in the experience summary list 802 exemplarily illustrated in FIG. 26, and the aggregated skill credibility measure corresponding to each of the skills in the skills profile list 303.

The focus of the experience rating and skill discovery system (ERSDS) 100 disclosed herein is on an improvement to the computer functionality itself, and not on economic or other tasks for which a generic computer is used in its ordinary capacity. Accordingly, the ERSDS 100 disclosed herein are not directed to an abstract idea. Rather, the ERSDS 100 disclosed herein is directed to a specific improvement to the way the ERSDS 100 operates, embodied in, for example, generating a skills profile list comprising skill profiles associated with the opportunity seekers, configuring a reviewer plausibility measure corresponding to each of the experience summary data elements in the skill profiles of the opportunity seekers in the relationship list, generating an aggregated experience plausibility measure and an aggregated experience credibility measure corresponding to each of the experience summary data elements in the experience summary list from the reviewer plausibility measure and the reviewer credibility measure respectively, generating an aggregated skill amount measure and an aggregated skill credibility measure corresponding to each of the skills in said skills profile list from the rating skill amount measure and the rating credibility measure respectively, etc.

Figure 2:
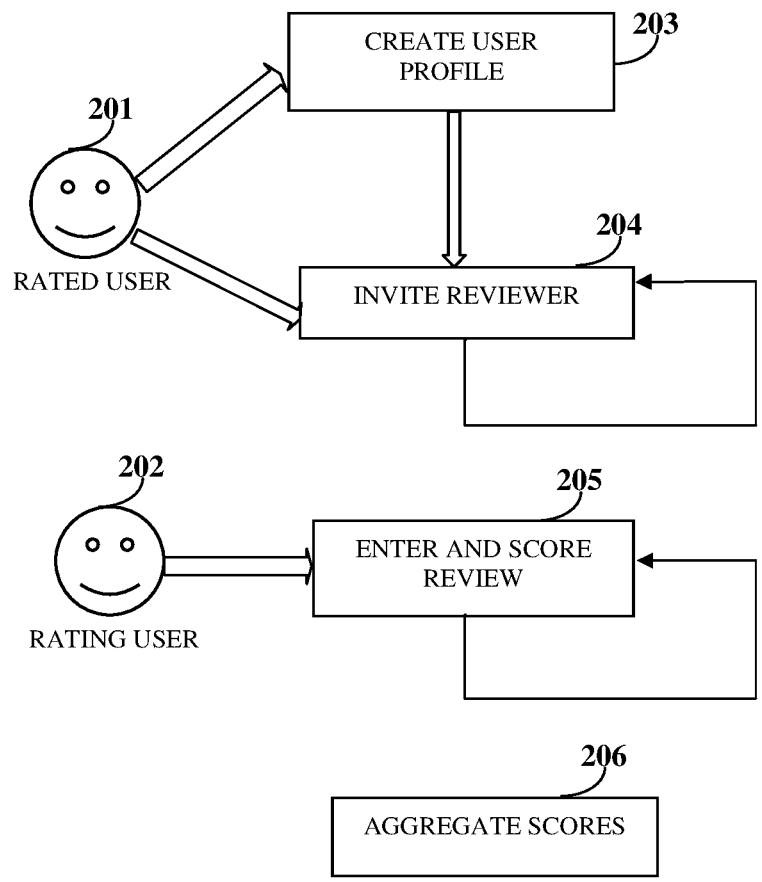
FIG. 2 exemplarily illustrates a flow diagram comprising the steps performed by an experience rating and skill discovery system for determining credibility of experience ratings provided by one or more reviewers and discovering skills of opportunity seekers based on a relationship between the reviewers and the opportunity seekers.

FIG. 2 exemplarily illustrates a flow diagram comprising the steps performed by the experience rating and skill discovery system (ERSDS) for determining credibility of experience ratings provided by one or more reviewers and discovering the skills of opportunity seekers based on a relationship between the reviewers and the opportunity seekers. An opportunity seeker, that is, a rated user 201 creates 203 a user profile comprising profile data in the ERSDS 100. The skill profile module 108a of the ERSDS 100 exemplarily illustrated in FIG. 1, generates a skill profile comprising skills possessed by the rated user 201 in a skills profile list 303 exemplarily illustrated in FIG. 25. The rated user 201 invites 204 one or more reviewers, that is, a rating user 202, and the invitation module 108c of the ERSDS 100 exemplarily illustrated in FIG. 1, transmits an invitation to the rating user 202 to evaluate experience summary data sets and the skills associated with the rated user 201 for determining plausibility of the experience summary data sets and skill amount measures of the skills associated with the experience summary data sets and the skill profile. The rating user 202 provides details of a relationship with the rated user 201 and scores 205 the experience summary data elements by providing a reviewer plausibility measure corresponding to each of the experience summary data sets. The user association module 108b and the rating module 108d of the ERSDS 100 exemplarily illustrated in FIG. 1, receive and store the relationship data in a relationship list 801 exemplarily illustrated in FIG. 27.

The rating module 108d of the experience rating and skill discovery system (ERSDS) 100 receives ratings provided by the rating user 202 for the skills in the form of a rating skill amount measure corresponding to each of the skills of the opportunity seeker. The rating module 108d receives a reviewer plausibility measure corresponding to each of the experience summary data elements in the skill profile of the rated user 201. The rating module 108d invokes the relationship measurement module 239 exemplarily illustrated in FIG. 15, external to the ERSDS 100 to compute a relationship depth corresponding to each of the skills. The rating module 108d invokes the credibility module 240 exemplarily illustrated in FIG. 16, external to the ERSDS 100 to compute a relationship depth corresponding to each of the skills, a rating credibility measure of each of the opportunity seeker skill in a ratings list 803 exemplarily illustrated in FIG. 28, and a reviewer credibility measure of each of the experience summary data elements in the relationship list 801. The aggregation module 108e of the ERSDS 100 exemplarily illustrated in FIG. 1, computes and aggregates 106 the scores, that is, the reviewer plausibility measures and the reviewer credibility measures of the experience summary data elements as disclosed in the detailed description of FIG. 18. The aggregation module 108e also aggregates the rating skill amount measures and the rating credibility measures of the skills of the opportunity seeker as disclosed in the detailed description of FIG. 21.

Figure 3:
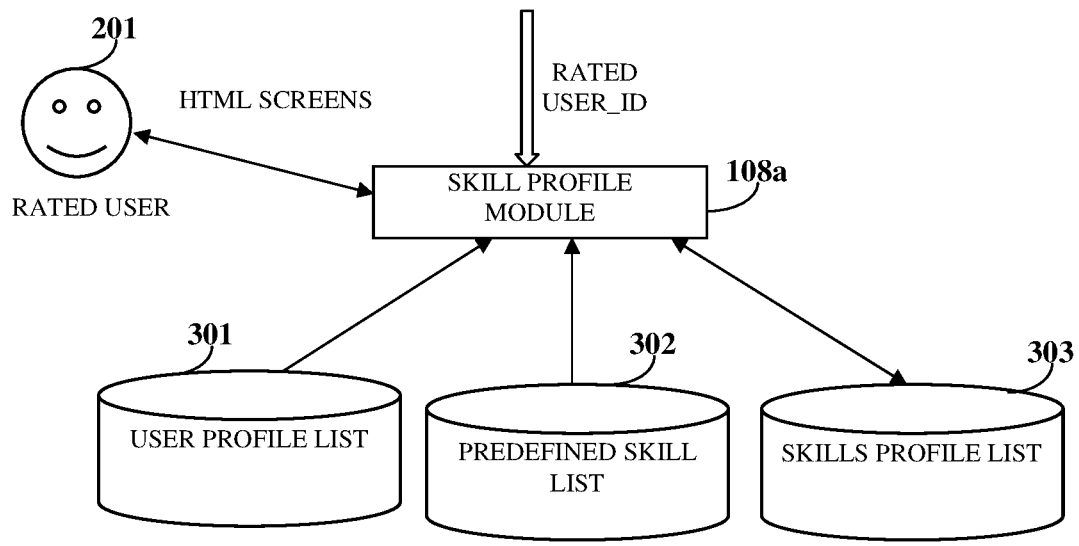
FIG. 3 exemplarily illustrates a schematic diagram showing a skill profile module of the experience rating and skill discovery system that uses profile data in a user profile list and a predefined skill list to generate a skills profile list.

FIG. 3 exemplarily illustrates a schematic diagram showing the skill profile module 108a of the experience rating and skill discovery system (ERSDS) 100 that uses profile data in the user profile list 301 and the predefined skill list 302 to generate the skills profile list 303. The opportunity seeker, that is, the rated user 201 provides a USER_ID, that is, a RATED_USER_ID, and for the RATED_USER_ID, the skill profile module 108a reads the profile data in the user profile list 301 and the skills in the predefined skill list 302 and generates or writes to the skills profile list 303. A web computer server 101, in communication with the user association module 108b exemplarily illustrated in FIG. 1 and executed by the processor 107 of the processing computer server 106, renders graphical user interfaces, for example, hypertext markup language (HTML) screens on a seeker device 102 of the rated user 201. The HTML screens display questions regarding skills possessed by the rated user 201. The user association module 108b processes responses provided by the rated user 201 to the questions. The skill profile module 108a generates the skills profile list 303 comprising multiple skill profiles. Each skill profile comprises a USER_ID identifying the rated user 201, an skill from the predefined skill list 302, and a skill profile name. The skill profile module 108a renders the skills profile list 303 on a graphical user interface of the seeker device 102. The skill profile module 108a pulls entries in the predefined skill list 302 and renders the entries on the seeker device 102, for example, as a pulldown list from which the rated user 201 selects the skills that are relevant to the skill profile and forms a part of the skills profile list 303. In an embodiment, a skill wizard on the seeker device 102 helps render the skills profile list 303 with relevant skills. In an embodiment, the skills profile list 303 rendered on the seeker device 102 is initialized by the skill wizard with a few entries comprising personal traits of the rated user 201 and the remaining entries are selected by the rated user 201 from the pulldown list.

The skill profile module 108a generates the skills profile list 303 of the rated users 201 with skill amount measures and skill credibility measures corresponding to the skills in the skills profile list 303. The skill amount measure is NULL and the skill credibility measure is NULL for each of the selected skills when the skills profile list 303 is generated by the skill profile module 108a. The user association module 108b receives the experience summary list 802 exemplarily illustrated in FIG. 26, comprising experience summary data sets associated with the rated users 201 in the skill profiles. The experience summary list 802 is pre-existent in the database. The skill profile module 108a only updates the skill profile name corresponding to the experience summary data elements in the experience summary list 802 to match the skill profile name in the skills profile list 303. The aggregation module 108e updates an experience plausibility measure and an experience credibility measure in an experience summary data set after a rollup of the reviewer plausibility measures and the reviewer credibility measures respectively, corresponding to the experience summary data sets in the relationship list 801 exemplarily illustrated in FIG. 27. In an embodiment, the skill profile module 108a collects the skill profile name from a selection of the skill profiles listed on the graphical user interfaces of the seeker devices by the rated users 201. In another embodiment, the skill profile module 108a adds new skill profiles comprising new skill profile names to the skills profile list 303.

Figure 4:
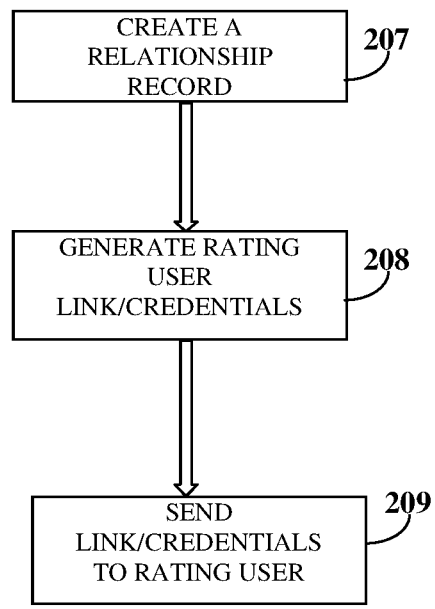
FIG. 4 exemplarily illustrates a flow diagram comprising the steps for inviting a reviewer to review experience summary data sets and skills of an opportunity seeker.

FIG. 4 exemplarily illustrates a flow diagram comprising the steps for inviting a reviewer, that is, a rating user 202 to review experience summary data sets and skills of an opportunity seeker, that is, the rated user 201 exemplarily illustrated in FIG. 2. The invitation module 108c of the experience rating and skill discovery system (ERSDS) 100 exemplarily illustrated in FIG. 1, transmits invitations comprising uniform resource locator (URL) links to reviewer devices of the rating users 202 for evaluating experience summary data sets associated with the rated users 201. In an embodiment, the invitations are, for example, personal text messages sent by a rated user 201 from a seeker device 102 to reviewer devices of the rating users 202. The user association module 108b exemplarily illustrated in FIG. 1, in communication with the skill profile module 108a, creates 207 a relationship record comprising details of a relationship between the rated user 201 and the rating user 202 in the relationship list 801 exemplarily illustrated in FIG. 27. The hash module, external to the ERSDS 100 and in communication with the user association module 108b and the invitation module, generates 208 a rating user link, for example, a URL link and login credentials for rendering a graphical user interface on the reviewer device of the rating user 202. The invitation module 108c further sends 209 the rating user link and the login credentials to the reviewer device of the rating user 202. An operational system of an entity inserts the created relationship record and ensures the rating user 202 is logged into the ERSDS 100. The operational system takes into account scenarios, for example, a rating user 202 volunteering to rate a third rated user, who the rating user 202 is aware, was involved in a job experience.

Figure 5:
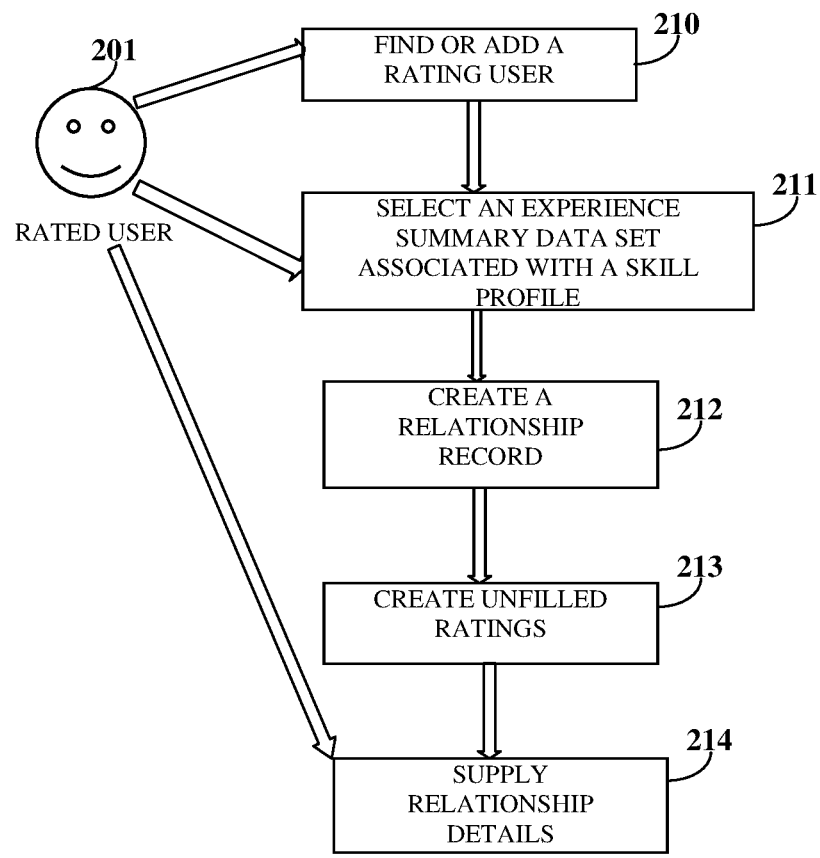
FIG. 5 exemplarily illustrates a flow diagram comprising the steps performed by a user association module of the experience rating and skill discovery system for creating a relationship record in a relationship list.

FIG. 5 exemplarily illustrates a flow diagram comprising the steps performed by the user association module 108b of the experience rating and skill discovery system (ERSDS) 100 exemplarily illustrated in FIG. 1, for creating a relationship record in the relationship list 801 exemplarily illustrated in FIG. 27. The user association module 108b determines whether profile data of the rating user 202 is available in the user profile list 301 exemplarily illustrated in FIG. 3. If the profile data is unavailable, the user association module 108b, in communication with the skill profile module 108a exemplarily illustrated in FIG. 3, finds or adds 210 the rating user 202 to the user profile list 301 with a corresponding new USER_ID based on the inputs from the rated user 201 on the seeker device 102 as exemplarily illustrated in FIG. 6. The rated user 201 selects 211 an experience summary data set associated with a skill profile from the experience summary list 802 exemplarily illustrated in FIG. 26. The user association module 108b creates 212 a relationship record in the relationship list 801 exemplarily illustrated in FIG. 25. The relationship record is an entry in the relationship list 801 identified by the REL_ID, comprising a RATED_USER_ID, a RATING_USER_ID, and the selected experience summary data set EXP_ID. The user association module 108b configures the reviewer plausibility measure in each relationship record in the relationship list 801 as NULL.

The user association module 108b creates 213 unfilled ratings in the ratings list 803 exemplarily illustrated in FIG. 28. In the ratings list 803, the user association module 108b determines the skill profile name in a relationship record identified by the REL_ID in the relationship list 801 exemplarily illustrated in FIG. 27, from the skill profile name in the experience summary data set identified by the EXP_ID in the experience summary list 802 exemplarily illustrated in FIG. 26. The user association module 108b then inserts a row identified by the RATED_USER_ID from the user profile list 301 and identified by the skill profile name for each of the skills of the opportunity seeker in the skill profiles that are identified by the RATED_USER_ID from the user profile list 301 and the skill profile name, into the ratings list 803 exemplarily illustrated in FIG. 28. That is, the user association module 108b inserts a row for each of the skills in the skill profiles in the skills profile list 303, into the ratings list 803, where the USER_ID in the skill profiles is the same as the RATED_USER_ID and the skill profile name in the skill profiles is the same as the determined skill profile name in the relationship record with a corresponding REL_ID. The row further comprises the created relationship record with the corresponding REL_ID from the relationship list 801, and NULL values for a rating skill amount measure AMOUNT_PRESENT and a strength of belief measure STRENGTH OF BELIEF as exemplarily illustrated in FIG. 26. The unfilled rows, that is, the rows with NULL values in the ratings list 803 await values from the rating user 202. In an embodiment, the ratings are added to the ratings list 803 only when the rating user 202 uses the experience rating and skill discovery system (ERSDS) 100 and supplies ratings.

Figure 8:
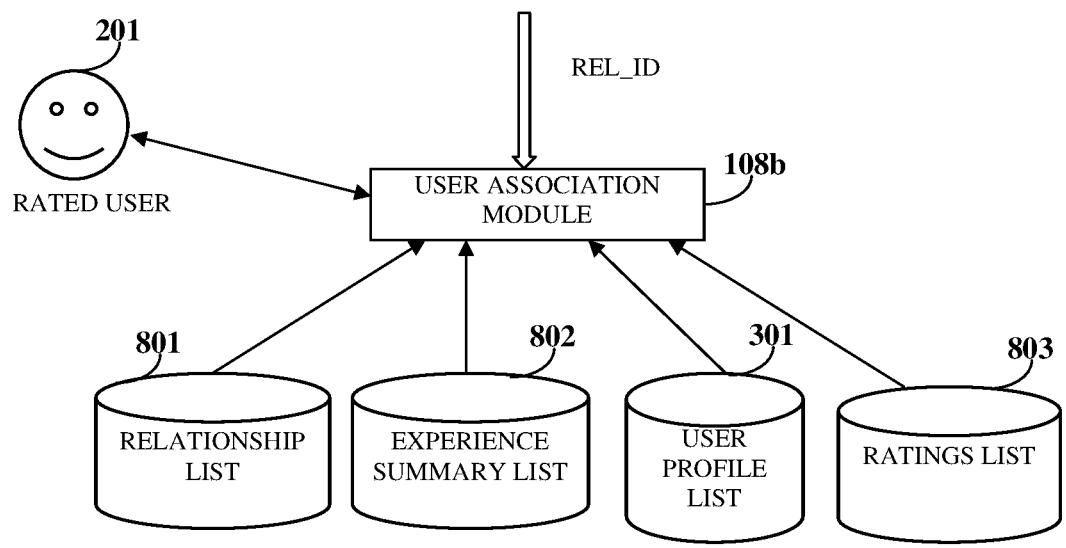
FIG. 8 exemplarily illustrates a schematic diagram showing the user association module that collects relationship data from an opportunity seeker about a relationship record created in the relationship list.

The user association module 108b, in communication with the database server 104 as exemplarily illustrated in FIG. 1, is invoked with the created relationship record with the corresponding REL_ID, and interacts with the rated user 201 to collect additional details about an experience summary data set corresponding to an EXP_ID as exemplarily illustrated in FIG. 8. The rated user 201 supplies 214 relationship details about the created relationship record to the user association module 108b in the form of responses to questions posed by the user association module 108b. The user association module 108b calls the relationship measurement module 239 exemplarily illustrated in FIG. 15, to collect additional details as determined by the relationship measurement module 239. The relationship measurement module 239, on review of the responses to the questions, assigns a relationship depth but not reviewer credibility measures to the created relationship record in the relationship list 801 exemplarily illustrated in FIG. 27. Furthermore, the relationship measurement module 239, on review of the responses to the questions, makes a judgment on whether a particular working relationship of the rated user 201 in a skill profile is justified, for example, whether reviews of the hypertext preprocessor (PHP) programming language by a rating user 202 are justified or not justified. The rating module 108d exemplarily illustrated in FIG. 1, updates the records in the ratings list 803 exemplarily illustrated in FIG. 28, with the computed relationship depth but does not update the rating credibility measure corresponding to the records in the ratings list 803. The relationship measurement module 239, knowing substantially more about the relationship between the rated user 201 and the rating user 202, makes judgments.

Figure 6:
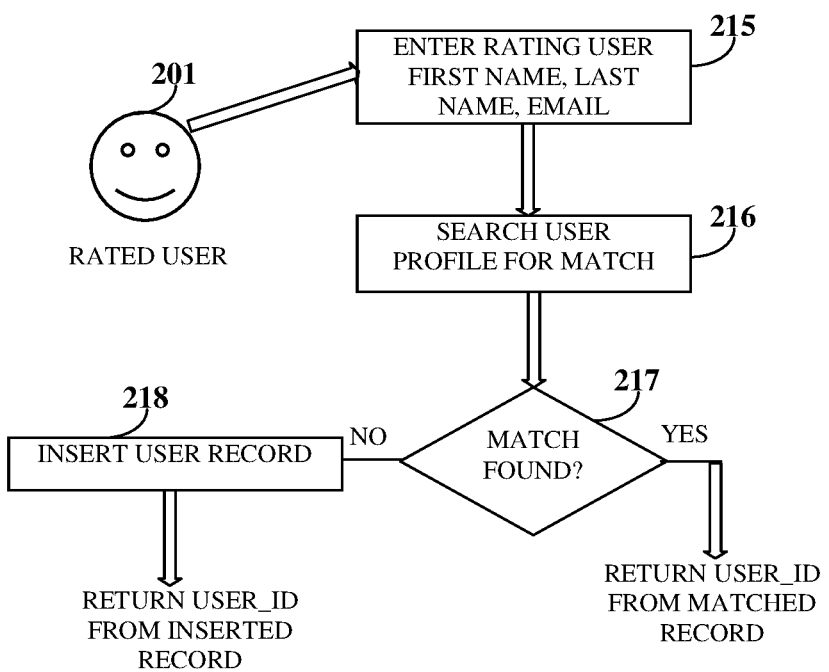
FIG. 6 exemplarily illustrates a flowchart comprising the steps performed by the user association module for finding or adding a reviewer to the user profile list.

FIG. 6 exemplarily illustrates a flowchart comprising the steps performed by the user association module 108b exemplarily illustrated in FIG. 8, for finding or adding a reviewer, that is, a rating user 202 to the user profile list 301 exemplarily illustrated in FIG. 24. The web computer server 101 of the experience rating and skill discovery system (ERSDS) 100 exemplarily illustrated in FIG. 1, renders graphical user interfaces 101a on the seeker devices 102 and the reviewer devices 103. The graphical user interfaces 101a are web based interfaces, for example, hypertext markup language (HTML) screens. The rated user 201 enters 215 profile data comprising, for example, a first name, a last name, and an electronic mail (email) address of the rating user 202 on the HTML screens rendered on the seeker devices. The user association module 108b searches 216 for a user profile in the user profile list 301 for a match with the entered profile data by the rated user 201. If the user association module 108b finds 217 an exact match of the first name, the last name, and the email address of the rating user 202 with a record in the user profile list 301, the user association module 108b assigns the USER_ID corresponding to the matching record as the USER_ID of the rating user 202. If the user association module 108b does not find 217 an exact match of the first name, the last name, and the email address of the rating user 202 with a record in the user profile list 301, the skill profile module 108a exemplarily illustrated in FIG. 1, inserts 218 a new record in the user profile list 301 comprising the first name, the last name, and the email address entered by the rating user 202 with a new USER_ID. In an embodiment, the user association module 108b performs a partial match of the first name, the last name, and the email address of the rating user 202 with a user profile in the user profile list 301.

Figure 7:
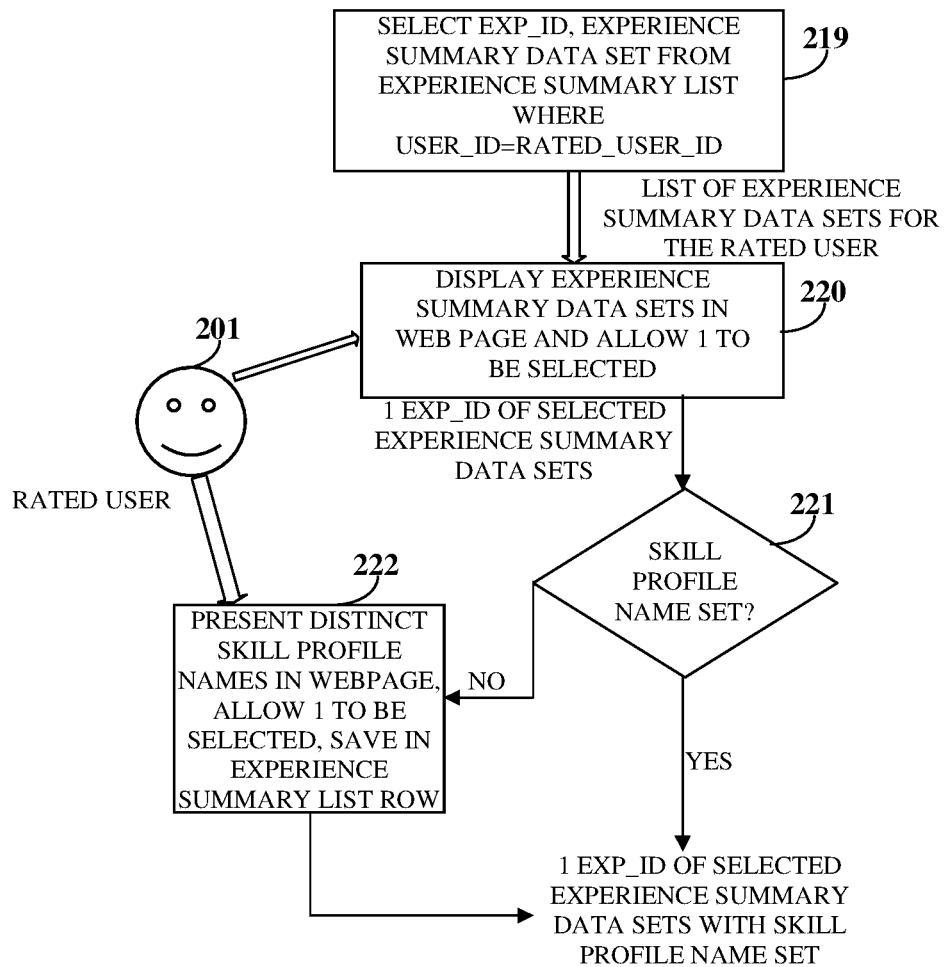
FIG. 7 exemplarily illustrates a flowchart comprising the steps for selecting an experience summary data set with a corresponding skill profile name from an experience summary list by an opportunity seeker.

FIG. 7 exemplarily illustrates a flowchart comprising the steps for selecting an experience summary data set with a corresponding skill profile name from the experience summary list 802 exemplarily illustrated in FIG. 26, by an opportunity seeker, that is, a rated user 201. The web computer server 101 renders graphical user interfaces 101a, for example, webpages or hypertext markup language (HTML) screens on the seeker device 102. The webpages display the experience summary data sets in the experience summary list 802 to allow the rated user 201 to select 219 EXP_IDs and experience summary data sets from the experience summary list 802 for a rated user 201, where USER_ID=RATED_USER_ID. The user association module 108b exemplarily illustrated in FIG. 1, displays 220 experience summary data sets associated with the rated user 201 and allows one of the experience summary data sets to be selected. The user association module 108b determines whether the experience summary data set is associated with a skill profile name. That is, the user association module 108b determines 221 whether the skill profile name for the experience summary data element is set. If the skill profile name is set, the user association module 108b displays the selected experience summary data set with the skill profile name. If the selected experience summary data set does not have a corresponding skill profile name, the user association module 108b presents 222 a list of distinct skill profile names from the skills profile list 303 exemplarily illustrated in FIG. 25, with corresponding USER_IDs on the seeker device 102. The rated user 201 selects one of the skill profile names from the provided list of distinct skill profile names, and the user association module 108b saves the selected skill profile name in the experience summary list 802 corresponding to the selected experience summary data set.

FIG. 8 exemplarily illustrates a schematic diagram showing the user association module 108b that collects the relationship data from an opportunity seeker, that is, the rated user 201, about a relationship record created in the relationship list 801. The created relationship record has a corresponding REL_ID that is passed to the relationship measurement module 239 exemplarily illustrated in FIG. 15. The user association module 108b receives and stores the relationship data, for example, in the form of responses to questions from the rated user 201 and transmits the responses to the relationship measurement module 239. The user association module 108b communicates with the database server 104 over the network 105 and accesses the user profile list 301 exemplarily illustrated in FIG. 24, the skills profile list 303 exemplarily illustrated in FIG. 3, the experience summary list 802, the relationship list 801, and the ratings list 803. In an embodiment, the user association module 108b maintains a local version of the user profile list 301, the skills profile list 303, the experience summary list 802, the relationship list 801, and the ratings list 803. In another embodiment, the user association module 108b maintains a local version of the user profile list 301, the skills profile list 303, the experience summary list 802, the relationship list 801, and the ratings list 803 in non-relational data stores. The user association module 108b poses questions, for example, "Were they your manager: 1" to the rated user 201 on the seeker device and receives responses to the questions. The relationship measurement module 239, in communication with the user association module 108b, interacts with the rated user 201 via the graphical user interfaces 101a, for example, webpages rendered on the seeker device 102 to learn more about the relationship between the rated user 201 and the rating user 202. The user association module 108b interacts with the rated user 201 via the seeker device 102 using different modes of interactions, for example, questions such as "How long did you work with them?" or "Did one of you supervise the other?". In an embodiment, the user association module 108b uses existing relationships in the relationship list 801 to refine the questions asked to the rated user 201, for example, "Did you also work with Mary?"

Figure 10:
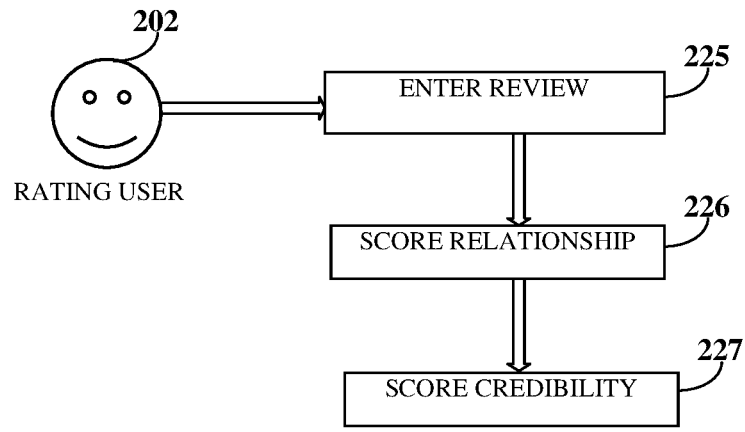
FIG. 10 exemplarily illustrates a flow diagram comprising the steps performed by the rating module for receiving ratings corresponding to each of the skills associated with the experience summary data elements and a reviewer plausibility measure corresponding to each of the experience summary data elements from the reviewers and the steps performed by a relationship measurement module and a credibility module external to the experience rating and skill discovery system for scoring the received ratings and the relationship data.

The rating module 108d exemplarily illustrated in FIG. 1, interacts with a rating user 202 as exemplarily illustrated in FIG. 10, using different modes of interactions, for example, questions and answers. The responses of the rating user 202 and the rated user 201 to the questions posed are used by the relationship measurement module 239 to compute a relationship depth of the relationship between the rating user 202 and the rated user 201.

Figure 9:
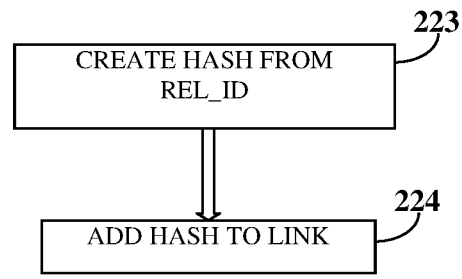
FIG. 9 exemplarily illustrates a flow diagram comprising the steps performed by a hash module for generating a uniform resource locator link for rendering graphical user interfaces on a reviewer device.

FIG. 9 exemplarily illustrates a flow diagram comprising the steps performed by the hash module for generating a uniform resource locator (URL) link, that is, a rating user link for rendering graphical user interfaces 101a on a reviewer device 103. The rating user 202 exemplarily illustrated in FIG. 2, uses the rating user link to initiate an interaction with the experience rating and skill discovery system (ERSDS) 100 to rate a rated user 201 exemplarily illustrated in FIG. 2. The REL_ID corresponding to a relationship between the rated user 201 and the rating user 202 is input to the hash module and the hash module encodes and encrypts the REL_ID in a manner acceptable to the ERSDS, for example, by creating 223 a hash value such as 13691c2BB680F8T1526455884. The encrypted hash value is then added 224 to a prototype link to create a URL link, for example, http://thesystem.com?rate=13691c2BB680F8T1526455884, that is used to interact with the ERSDS as the rating user 202. In an embodiment, the hash module returns the REL_ID. In this embodiment, the URL link generated is, for example, http://thesystem.com?rel_id=2. In an embodiment, the URL link is sufficient to log in the rating user 202. In an embodiment, the rating user 202 also receives additional login credentials as a part of the invitation from the skill profile module 108a exemplarily illustrated in FIG. 1. The rating user 202 logs in with the login credentials in a manner similar to logging in from a social networking website.

The invitation module 108c in communication with the rated user 201 transmits invitations comprising the rating user link to the rating user 202. In an embodiment, the invitation module 108c displays the generated rating user link to the rated user 201 in the graphical user interfaces 101a of the seeker device 102 and offers to transmit the invitation to the rated user 201, for example, via an electronic mail (email). The invitation module 108c composes an email based on a template with information of the rated user 201 and the rating user 202, for example, the email addresses of the rated user 201 and the rating user 202 and transmits the generated rating user link as a body of the email to the email address of the rating user 202.

Figure 15:
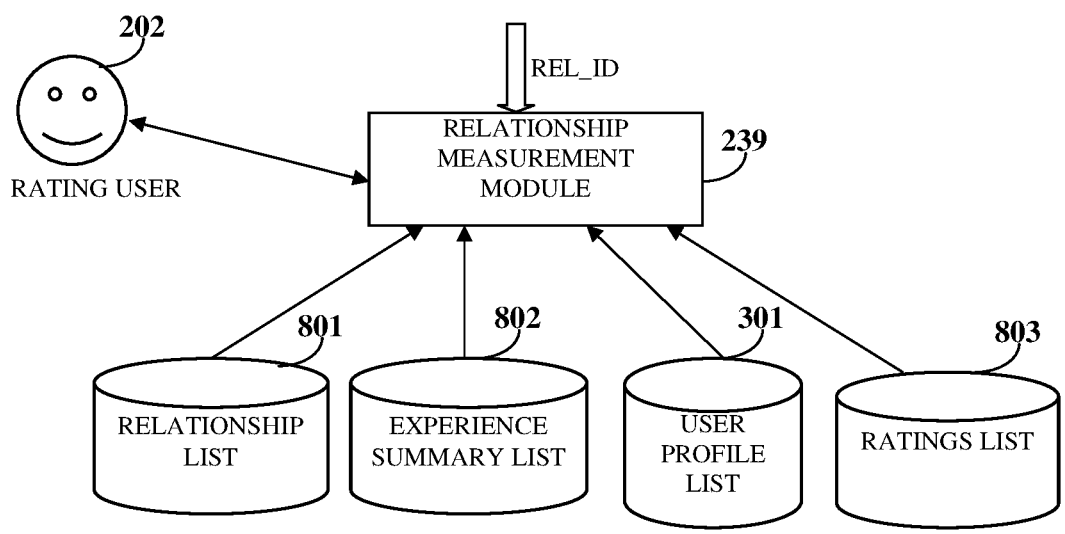
FIG. 15 exemplarily illustrates a schematic diagram showing the relationship measurement module that computes a relationship depth of a relationship between an opportunity seeker and a reviewer.
Figure 16:
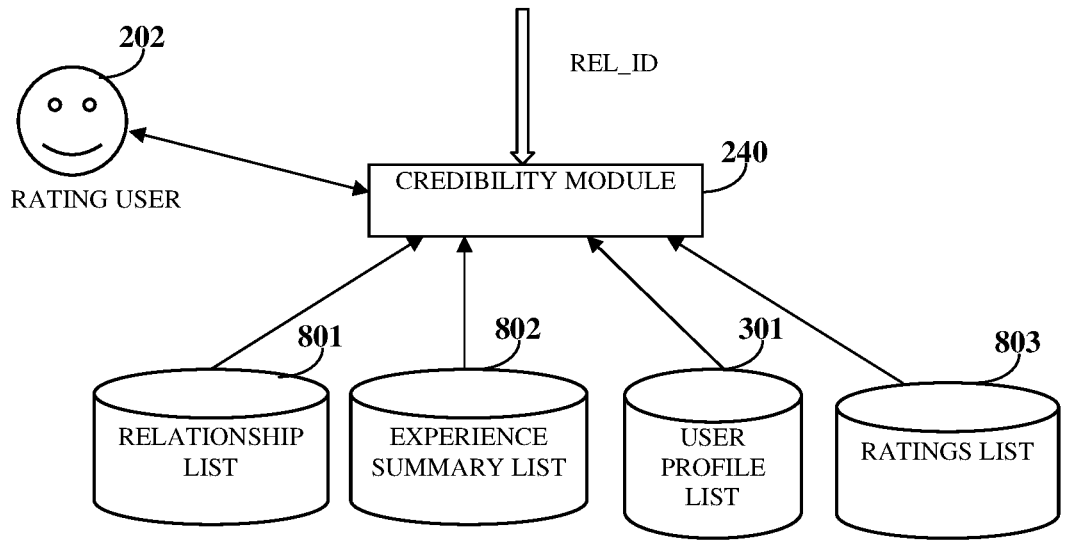
FIG. 16 exemplarily illustrates a schematic diagram showing the credibility module that computes and stores rating credibility measures of the skills.

FIG. 10 exemplarily illustrates a flow diagram comprising the steps performed by the rating module 108d exemplarily illustrated in FIG. 1, for receiving ratings corresponding to each of the skills associated with the experience summary data elements and a reviewer plausibility measure corresponding to each of the experience summary data elements from the reviewers and the steps performed by the relationship measurement module 239 and the credibility module 240 exemplarily illustrated in FIG. 15 and FIG. 16 respectively, external to the experience rating and skill discovery system (ERSDS) 100 for scoring the received ratings and the relationship data. The rating user 202 enters 225 a review in the form of responses to questions posed by the rating module 108d on the graphical user interfaces 101a of the reviewer device 103 as disclosed in the detailed description of FIG. 8. The relationship measurement module 239 evaluates the responses and scores 226 the relationship by computing a relationship depth of a relationship between the rating user 202 and the rated user 201 exemplarily illustrated in FIG. 2, per skill possessed by the rated user 201. In an embodiment, the relationship depth is received as part of the ratings comprising the rating skill amount measure and the strength of belief measure. The rating module 108d alters the relationship depth in the ratings list 803 exemplarily illustrated in FIG. 28, based on the responses provided by the rating user 202. The credibility module 240 is invoked by the rating module 108d to score 227 the received rating skill amount measure and the received strength of belief measure corresponding to each of the skills and the reviewer plausibility measure corresponding to each of the experience summary data elements based on the relationship depths computed by the relationship measurement module 239. The credibility module 240 computes a rating credibility measure of each of the skills and a reviewer credibility measure of each of the experience summary data elements.

Figure 11:
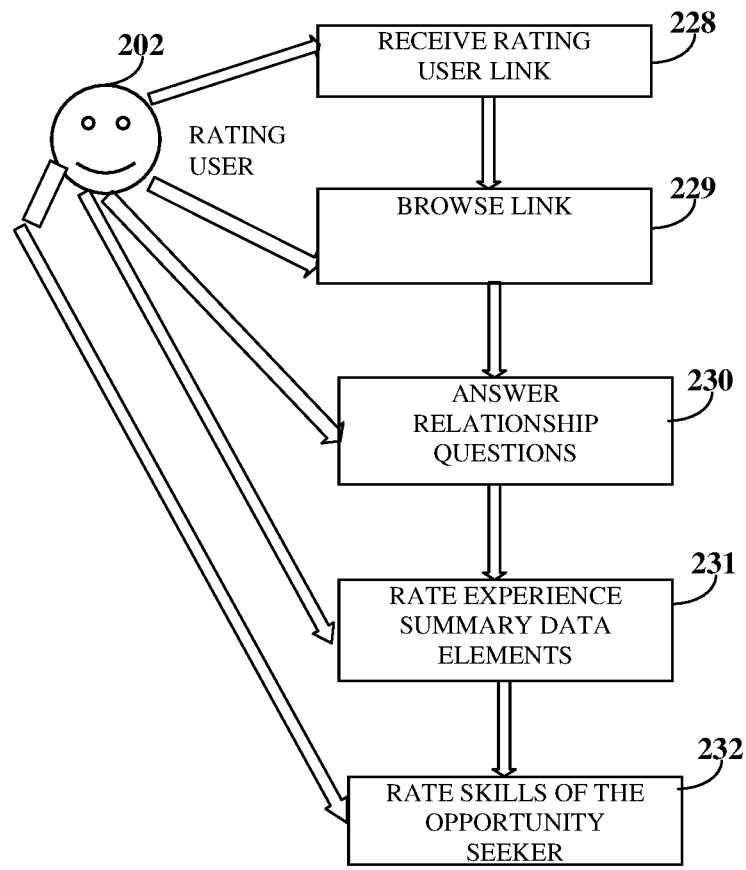
FIG. 11 exemplarily illustrates a flow diagram comprising the steps for providing ratings corresponding to each of the skills associated with the experience summary data sets of an opportunity seeker, by a reviewer.

FIG. 11 exemplarily illustrates a flow diagram comprising the steps for providing the ratings corresponding to each of the skills associated with the experience summary data sets of an opportunity seeker, that is, the rated user 201, by a reviewer, that is, a rating user 202 exemplarily illustrated in FIG. 2. The rating user 202 receives 228 the rating user link, for example, by either an electronic mail (email) from the invitation module of the experience rating and skill discovery system (ERSDS) or by a text message sent from the seeker device of the rated user 201. The rating user link comprises the REL_ID corresponding to a relationship between the rated user 201 and the rating user 202 in an encrypted computer readable form. On clicking the rating user link, graphical user interfaces 101a are rendered on the reviewer device 103 for the rating user 202 to provide the ratings. When the rating user 202 browses 229 the rating user link, a web session is created that caches the REL_ID for the remainder of the web session. From the REL_ID, the rating module 108d exemplarily illustrated in FIG. 1, determines the rated user 201, the rating user 202, and the experience summary data sets identified by the EXP_ID involved in the relationship identified by the REL_ID. The rating module 108d presents the rating user 202 with questions regarding the relationship with the rated user 201. The rating user 202 answers 230 the questions via the graphical user interfaces, for example, webpages rendered on the reviewer device where the rating user 202 rates 231 the experience summary data elements of the experience summary data sets identified by the EXP_ID. The rating user 202 provides the ratings via the graphical user interfaces 101a, for example, webpages rendered on the reviewer device 103 where the rating user 202 rates 232 the skills possessed by the opportunity seekers 201. In an embodiment, steps 230, 231, and 232 are performed in different sequences.

In an embodiment, if the rating user 202 is already logged into the experience rating and skill discovery system (ERSDS) 100 as a rated user 201 or as a rating user 202 who rates another rated user 201, the rating user 202 navigates to a graphical user interface 101a listing all the experience summary data sets to be reviewed by the rating user 202 based on received invitations to rate. The rating user 202 is allowed to select one of the experience summary data sets to rate and the steps disclosed in the detailed description of FIG. 11 are executed. In an embodiment, the rating user 202, if interacting for the first time with the ERSDS 100, is requested to provide login credentials, for example, a password by the rating module 108d. If the rating user 202 is interacting with the ERSDS 100 for a subsequent time, the rating module 108d requests the rating user 202 for the login credentials and the login credentials are checked before initiating a session as the rating user 202 in the ERSDS 100.

Figure 12:
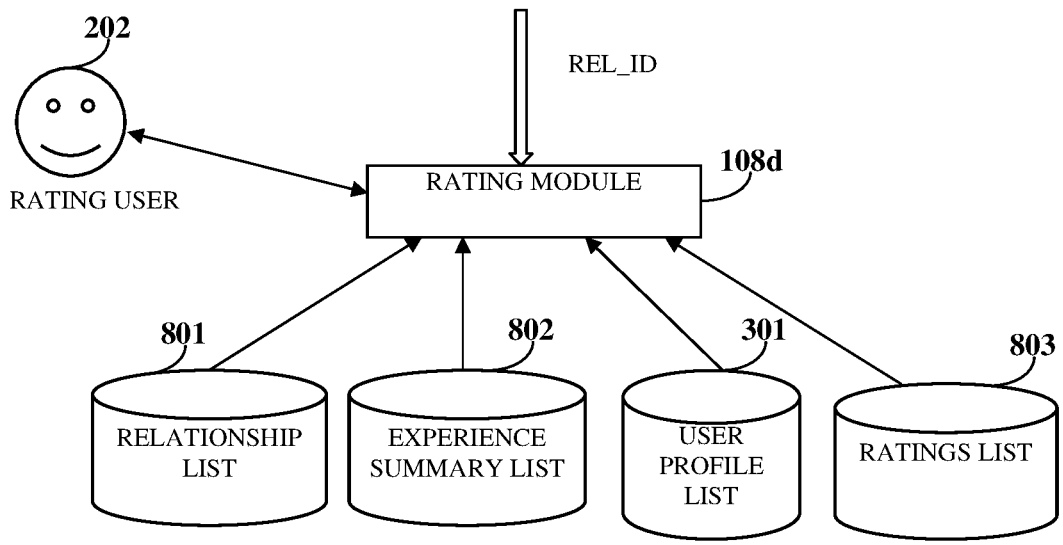
FIG. 12 exemplarily illustrates a schematic diagram showing the rating module that invokes a relationship measurement module to compute and sent the relationship depth of the relationship record in the relationship list.

FIG. 12 exemplarily illustrates a schematic diagram showing the rating module 108d that invokes a relationship measurement module 239 to compute and send the relationship depth of the relationship record in the relationship list 801. The rating module 108d caches the responses provided by the rated user 201 for the questions posed as disclosed in the detailed description of FIG. 8, and the relationship measurement module 239 exemplarily illustrated in FIG. 15, uses the responses from the rated user 201 in selecting questions to be posed by the rating module 108d to the rating user 202 regarding the relationship with the rated user 201. If the user association module 108b exemplarily illustrated in FIG. 1, for example, receives a first response from the rated user 201 as "I don't know", the rating module 108d poses more questions to the rating user 202 that should have been answered by the rated user 201. Furthermore, if the user association module 108b, for example, receives a first response from the rated user 201, the rating module 108d poses more questions to the rating user 202 to check consistency of the responses provided by the rated user 201 to the questions. The rating module 108d passes the REL_ID corresponding to the relationship between the rated user 201 and the rating user 202 to the relationship measurement module 239.

The rating module 108d communicates with the database server over the network and accesses the user profile list 301, the skills profile list 303 exemplarily illustrated in FIG. 3, the experience summary list 802, the relationship list 801, and the ratings list 803. The rating module 108d interacts with the rating user 202 via the reviewer device using different modes of interactions, for example, questions such as "How long did you work with them?" or "Did one of you supervise the other?". In an embodiment, the rating module 108d, in communication with the relationship measurement module 239, uses existing relationships in the relationship list 801 to refine the questions asked to the rating user 202, for example, "Did you also work with Mary?". In an embodiment, profile data of the rated user 201, for example, a resume claim of the rated user 201, is a part of the questions posed to the rating user 202. The relationship measurement module 239 computes and sets the relationship depth of the relationship record in the relationship list 801 with the matching REL_ID and each skill corresponding to the REL_ID in the ratings list 803. The relationship measurement module 239, for example, determines that the relationship between the rated user 201 and the rating user 202 is not deep in regard to knowledge of the hypertext preprocessor (PHP) programming language skills, but is deep for knowledge of customer relations skills. The relationship measurement module 239 sets the relationship depths for PHP programming skills corresponding to the REL_ID in the ratings list 803.

Figure 13:
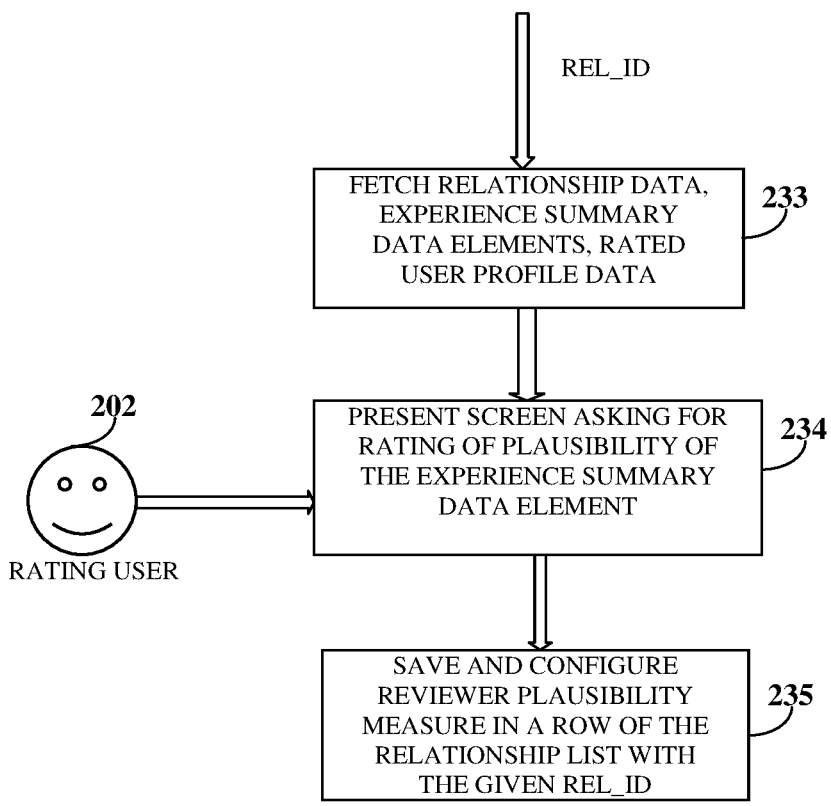
FIG. 13 exemplarily illustrates a flow diagram comprising the steps performed by the rating module for receiving and configuring a reviewer plausibility measure of an experience summary data set from a reviewer device.

FIG. 13 exemplarily illustrates a flow diagram comprising the steps performed by the rating module 108d exemplarily illustrated in FIG. 12, for receiving and configuring a reviewer plausibility measure of an experience summary data set from a reviewer device 103. For a relationship identified by the REL_ID in the relationship list 801, the rating module 108d fetches 233 the relationship data, the experience summary data elements, and the profile data of the rated user 201 exemplarily illustrated in FIG. 2, from the relationship list 801, the experience summary list 802, and the user profile list 301 respectively, exemplarily illustrated in FIG. 12. The rating module 108*d* presents 234 graphical user interfaces 101*a*, for example, webpages or web screens on the reviewer device 103 of the reviewer, that is, the rating user 202. The graphical user interfaces 101*a* comprise information identifying the rated user 201 and the experience summary data elements. The rating user 202 makes a selection of a numerical value that indicates plausibility of the experience summary data element being associated with the rated user 201, in the opinion of the rating user 202, on the graphical user interface 101*a*. The selection on the graphical user interface 101*a* is a direct numerical entry or any of the many user interface techniques comprising, for example, pulldown lists, stars, etc. The rating module 108*d* saves and configures 235 the numerical selection as a reviewer plausibility measure in a row of the relationship list 801 corresponding to the given REL_ID.

Figure 14:
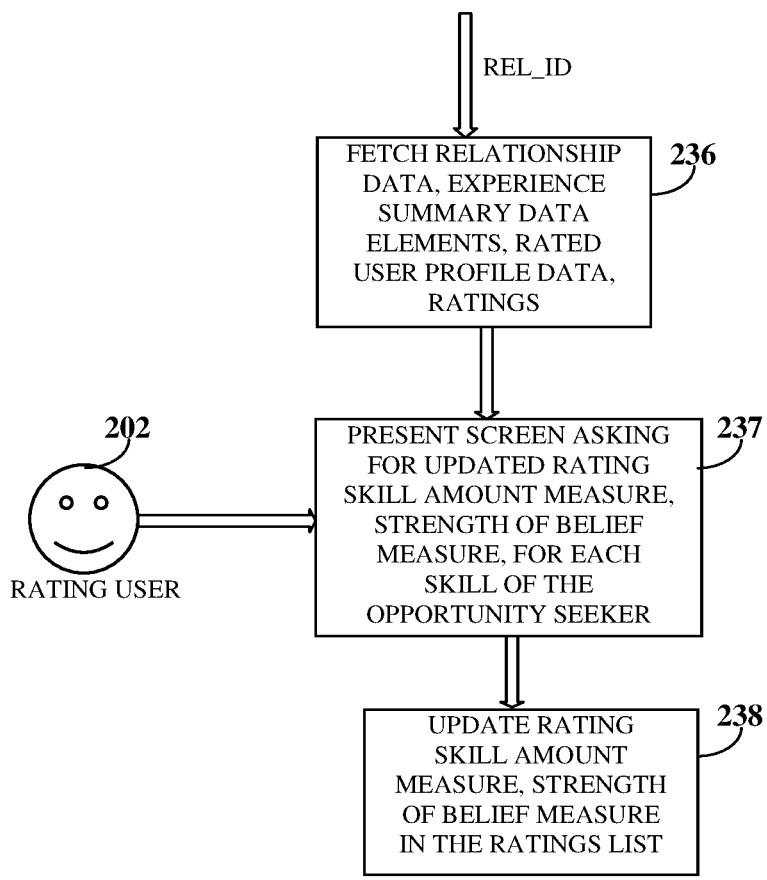
FIG. 14 exemplarily illustrates a flow diagram comprising the steps performed by the rating module for receiving ratings corresponding to skills in the skills profile list from a reviewer device.

FIG. 14 exemplarily illustrates a flow diagram comprising the steps performed by the rating module 108*d* exemplarily illustrated in FIG. 1, for receiving ratings corresponding to skills in the skills profile list 303 exemplarily illustrated in FIG. 3, from a reviewer device 103. For a relationship identified by the REL_ID, the rating module 108*d* fetches 236 the relationship data, the experience summary data elements, the profile data of the rated user 201 exemplarily illustrated in FIG. 2, and the ratings from the relationship list 801, the experience summary list 802, the user profile list 301, and the ratings list 803 respectively, exemplarily illustrated in FIG. 12. The rating module 108*d* presents 237 graphical user interfaces 101*a*, for example, webpages or web screens on the reviewer device 103 of the reviewer, that is, the rating user 202. The graphical user interfaces 101*a* comprise information identifying the rated user 201 and a list of skills possessed by the rated user 201 present in the skills profile list 303. The list of the skills comprises the skills from the ratings list 803 corresponding to the REL_ID given in the rating user link. In the graphical user interfaces 101*a*, the rating module 108*d* provides, for each skill in the list of skills, a container to enter the rating skill amount measure and the strength of belief measure. In an embodiment, the rating user 202 enters the rating skill amount measure and the strength of belief measure, for example, via stars or pulldown lists for each of the skills in the list of skills. In an embodiment, the rating skill amount measure and the strength of belief measure of the skills are set to a predefined default value, that is, rarely altered by the rating user 202. The rating user 202 interacts with the graphical user interfaces 101*a*, for example, webpages to supply ratings for some of the skills. The rating module 108*d* receives and updates 238 the rating skill amount measure and the strength of belief measure in the ratings list 803 corresponding to the skills without affecting the values for the relationship depth and the rating credibility measure.

FIG. 15 exemplarily illustrates a schematic diagram showing the relationship measurement module 239 that computes a relationship depth of a relationship between an opportunity seeker, that is, the rated user 201 exemplarily illustrated in FIG. 2, and a reviewer, that is, the rating user 202. The relationship measurement module 239 is invoked with a REL_ID identifying the relationship between the rated user 201 and the rating user 202. The relationship measurement module 239 computes the relationship depth of the relationship and updates the computed relationship depth in the relationship list 801 and the ratings list 803. The relationship measurement module 239 computes the relationship depth based on the responses received from the rated user 201 and the rating user 202 as disclosed in the detailed description of FIG. 8 and FIG. 12. In an embodiment, the relationship measurement module 239 computes the relationship depth based on the responses from other rated users 201 and other rating users 202 who are relevant to the relationship between the rated user 201 and the rating user 202. In an embodiment, the relationship measurement module 239 applies skill specific adjustments, for example, awareness that a rating user 202 has a high relationship depth to rate Microsoft® Office skills but has a low relationship depth to rate hypertext preprocessor (PHP) code development skills. Based on the computed relationship depth, the relationship measurement module 239 lowers a previously assigned relationship depth when some of the skills expected to be rated by the rating user 202 remain unrated. At the end of the processing by the relationship measurement module 239, the relationship depth in the relationship list 801 and the relationship depth in the ratings list 803 are set.

FIG. 16 exemplarily illustrates a schematic diagram showing the credibility module 240 that computes and stores rating credibility measures of the skills. The credibility module 240 is invoked with the REL_ID. The credibility module 240 considers the relationship list 801 and the ratings list 803, including the relationship depth and the reviewer plausibility measure. The credibility module 240 computes and updates the rating credibility measure associated with the REL_ID in the ratings list 803. The credibility module 240 updates the reviewer credibility measure associated with the REL_ID in the relationship list 801. In an embodiment, the credibility module 240 presumes that when all of the ratings provided by a rating user 202 are high, then the ratings from the rating user 202 will have a low credibility measure. In another embodiment, the credibility module 240 alters the reviewer credibility measure and the rating credibility measure based on responses from other rated users 201 and other rating users 202 who are relevant to the relationship between the rated user 201 exemplarily illustrated in FIG. 2, and the rating user 202. In an embodiment, the credibility module 240 applies skill specific adjustments, for example, awareness that a rating user 202 has a high relationship depth to rate Microsoft® Office skills with a high rating credibility measure, but has a low relationship depth to rate hypertext preprocessor (PHP) code development skills, and any such ratings are to have low credibility measures. In an embodiment, the rating users 202 who have rated other rated users 201 with a high reviewer credibility measure will have the ratings assigned a higher credibility measure than the ratings the rating users 202 will otherwise receive. At the end of the processing by the credibility module 240, the reviewer credibility measure in the relationship list 801 for the relationship between the rated user 201 and the rating user 202 and the rating credibility measure in the ratings list 803 for the skills are set.

The rating module 108*d* exemplarily illustrated in FIG. 1, updates the relationship depths in the ratings list 803 and the relationship list 801 after receiving ratings from the rating user 202. After all the ratings have been provided, the rating module 108*d* calls the relationship measurement module 239 exemplarily illustrated in FIG. 15, again where the rating module 108*d* cannot ask further questions but may update the ratings in the ratings list 803. The rating module 108*d*, in communication with the relationship measurement module 239, based on the ratings received, does not pose questions to the rating user 202 regarding the skill if the relationship between the rated user 201 and the rating user 202 is weak. That is, the relationship measurement module 239 determines that the lack of ratings for certain skills implies a weaker relationship between the rated user 201 and the rating user 202 than previously determined, and the relationship measurement module 239 determines that the ratings for other skills possessed by the rated user 201 provided by the rating user 202 are unjustified by the relationship between the rated user 201 and the rating user 202. For example, if the rating user 202 skips to provide all the ratings in the ratings list 803, then the rating module 108*d*, in communication with the relationship measurement module 239, may conclude that the relationship did not go that deep and is weak and may not pose questions to the rating user 202.

Figure 17:
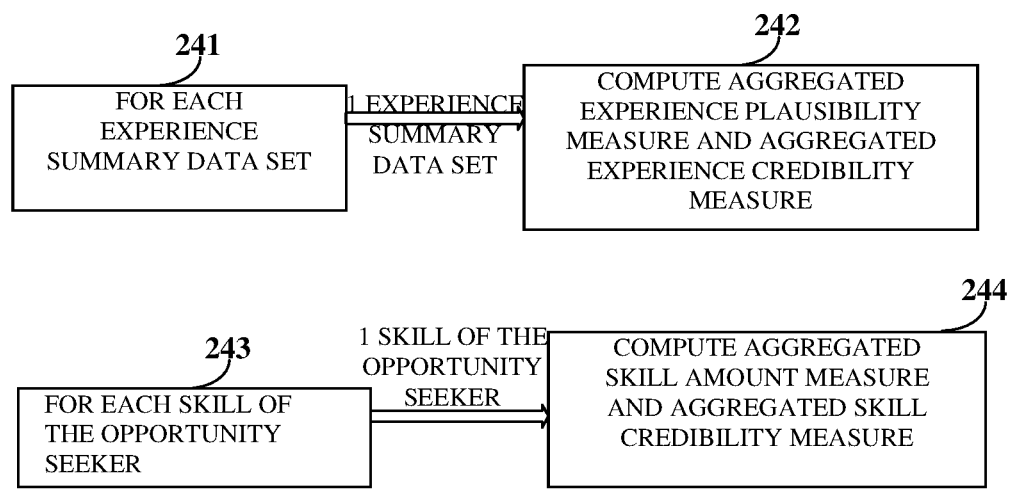
FIG. 17 exemplarily illustrates flow diagrams comprising the steps performed by an aggregation module of the experience rating and skill discovery system for aggregating relationship data and ratings.

FIG. 17 exemplarily illustrates flow diagrams comprising the steps performed by the aggregation module 108*e* of the experience rating and skill discovery system (ERSDS) 100 exemplarily illustrated in FIG. 1, for aggregating the relationship data and ratings. The aggregation module 108*e* aggregates the reviewer plausibility measure and the reviewer credibility measure for each of the experience summary data elements associated with the relationship records in the relationship list 801. The aggregation module 108*e* also aggregates the rating skill amount measure and the rating credibility measure corresponding to each of the skills in the ratings list 803. The aggregation module 108*e* is invoked at any time, for example, after each review of the experience summary data sets and the skills, or on demand, or as batch runs. For an experience summary data set 241 identified by the EXP_ID in the experience summary list 802 exemplarily illustrated in FIG. 8, the aggregation module 108*e* computes 242 an aggregated experience plausibility measure and an aggregated experience credibility measure and updates these aggregated measures as an experience plausibility measure and an experience credibility measure respectively, in the experience summary data set 241 identified by the EXP_ID in the experience summary list 802. For each skill 243 in the skills profile list 303 exemplarily illustrated in FIG. 3, possessed by a rated user 201 exemplarily illustrated in FIG. 2, with the USER_ID in a skill profile, the aggregation module computes 244 an aggregated skill amount measure and an aggregated skill credibility measure and updates these aggregated measures as a skill amount measure and a skill credibility measure respectively, in the skills profile list 303.

FIG. 18 exemplarily illustrates a flow diagram comprising the steps performed by the measure aggregator 246 invoked by the aggregation module 108*e* for computing an aggregated experience plausibility measure and an aggregated experience credibility measure for a single experience summary data set. The measure aggregator 246 is invoked by the aggregation module 108*e* with a reviewer plausibility measure and a reviewer credibility measure corresponding to an experience summary data set identified by the EXP_ID. The aggregation module 108*e* fetches 245 the reviewer plausibility measures and the reviewer credibility measures for the relationship records with the EXP_ID. The fetched reviewer plausibility measures and the fetched reviewer credibility measures are passed to the measure aggregator 246 and the measure aggregator 246 returns a tuple comprising an aggregated experience plausibility measure and an aggregated experience credibility measure respectively, as exemplarily illustrated in FIG. 19. The aggregation module 108*e* updates 247 the experience plausibility measure and the experience credibility measure corresponding to the experience summary data set identified by the EXP_ID in the experience summary list 802 exemplarily illustrated in FIG. 7, with the aggregated experience plausibility measure and the aggregated experience credibility measure respectively.

FIG. 19 exemplarily illustrates a flow diagram comprising the steps performed by the measure aggregator 246 for computing an aggregated experience plausibility measure or an aggregated skill amount measure and an aggregated experience credibility measure or an aggregated skill credibility measure. The measure aggregator 246 is invoked with a list of tuples, where one element of a tuple in the list is the rating skill amount measure or the reviewer plausibility measure to aggregate and the other element of the tuple in the list is the rating credibility measure or the reviewer credibility measure. The measure aggregator 246 computes and returns a single tuple with an aggregated measure, that is, the aggregated skill amount measure or the aggregated experience plausibility measure and the aggregated skill credibility measure or the aggregated experience credibility measure respectively.

FIG. 20 exemplarily illustrates a flow diagram comprising the steps performed by the measure aggregator 246 for generating the aggregated experience credibility measure and the aggregated experience plausibility measure. The measure aggregator 246 is invoked with any number of tuples comprising reviewer plausibility measures and reviewer credibility measures corresponding to the experience summary data sets identified by the EXP_ID in the relationship list 801. The measure aggregator 246 computes 248 the aggregated experience plausibility measure as Sum (reviewer plausibility measure*reviewer credibility measure)/Sum (reviewer credibility measure). The measure aggregator 246 computes 249 an aggregated unadjusted credibility measure as Sum (reviewer credibility measure*reviewer credibility measure)/Sum (reviewer credibility measure). The measure aggregator 246 computes 250 a credibility bump as Sum (reviewer credibility measure*reviewer credibility measure)*coeff_credbump–coeff_credbump, where coeff_credbump is a system constant. The measure aggregator 246 computes 251 an aggregated experience credibility measure as aggregated unadjusted credibility measure+credibility bump but then adjusted to not be lower than a predefined minimum value or larger than a predefined maximum value. The aggregated experience plausibility measure and the aggregated experience credibility measure are then returned as a tuple. In an embodiment, the measure aggregator 246 computes the credibility bump as a lookup of the sum of the reviewer credibility measure against a predefined credibility bump lookup table. The foregoing formulas have been provided merely for explanation and are in no way to be construed as limiting the step of generating the aggregated experience credibility measure and the aggregated experience plausibility measure disclosed herein.

FIG. 21 exemplarily illustrates a flow diagram comprising the steps performed by the aggregation module 108*e* exemplarily illustrated in FIG. 1, for computing an aggregated skill amount measure and an aggregated skill credibility measure for a single skill in the skills profile list 303 exemplarily illustrated in FIG. 3. The aggregation module 108*e* is invoked with a USER_ID, a skill, and a skill profile name. The aggregation module 108*e* scans through the skills profile list 303 and for each skill in the skills profile list 303, the aggregation module fetches 252, from the ratings list 803 exemplarily illustrated in FIG. 8, a rating skill amount measure and a rating credibility measure for the skill with the REL_ID of an experience summary data set comprising the same USER_ID and the same skill profile name. The aggregation module 108e makes a list of all the rating skill amount measures and the rating credibility measures from the ratings list 803 for a combination of the USER_ID, the skill, and the skill profile name in the skills profile list 303.

A pseudocode defined by the aggregation module 108e executable by at least one processor 107 of the processing computer server 106 of the experience rating and skill discovery system (ERSDS) 100 for fetching the rating skill amount measures and the rating credibility measures from the ratings list 803 for a combination of the USER_ID, an skill, and a skill profile name from the ratings list 803 is disclosed below:

SELECT AMOUNT_PRESENT, credibility FROM ratings WHERE skill=$skill AND REL_ID IN (SELECT REL_ID FROM relationship WHERE EXP_ID IN (SELECT EXP_ID from job_experience where USER_ID=$USER_ID and profile_name=$profile_name))

The measure aggregator 246 works on the fetched rating skill amount measures and the rating credibility measures and returns a tuple comprising a single aggregated skill amount measure and a single aggregated skill credibility measure. The aggregation module 108e updates 253 the skill amount measure and the skill credibility measure corresponding to the skills in the skills profile list 303 with the aggregated skill amount measure and the aggregated skill credibility measure respectively.

Figure 22A:
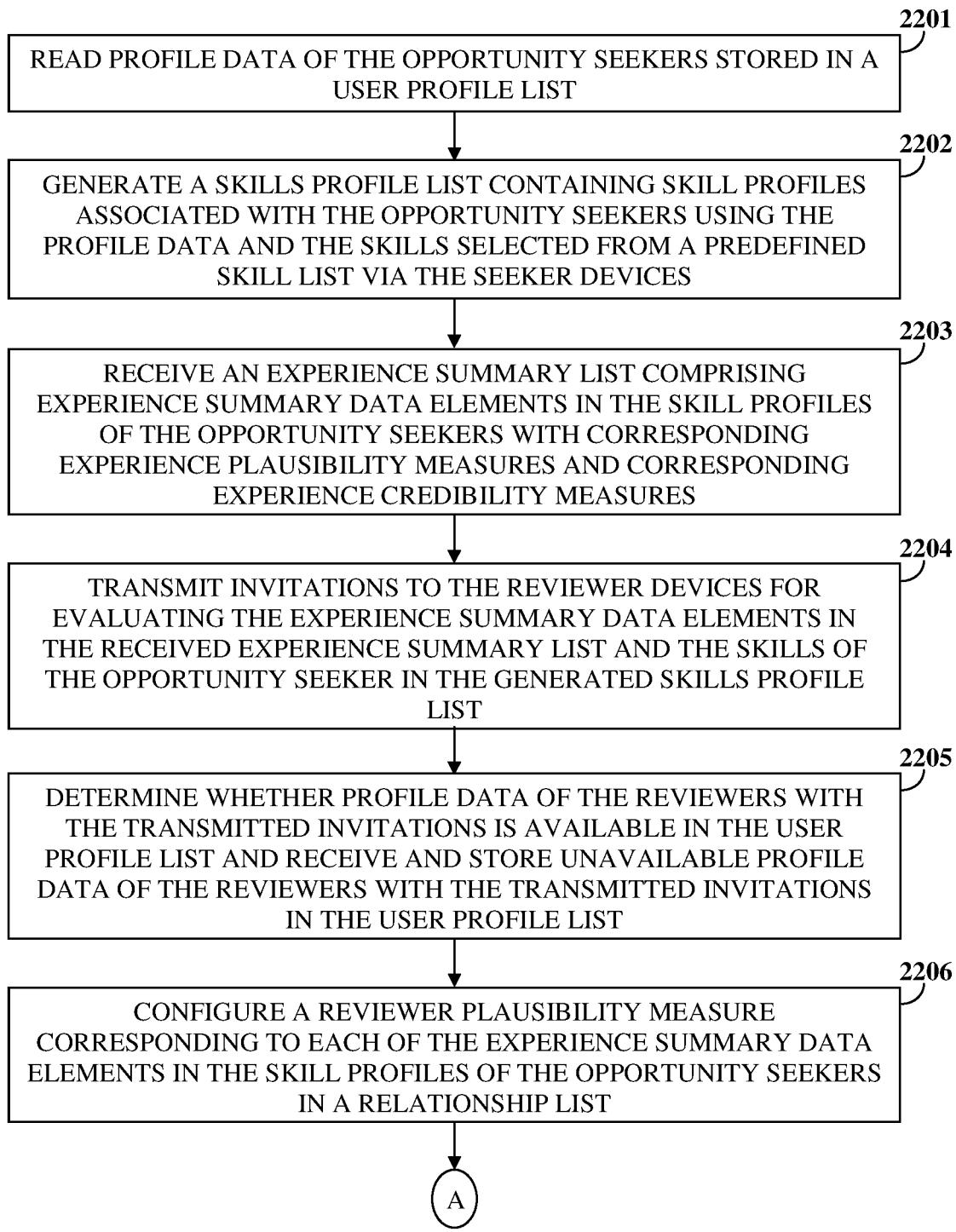
FIGS. 22A-22C exemplarily illustrates a method for determining credibility of experience ratings provided by one or more reviewers and discovering skills of opportunity seekers based on a relationship between the reviewers and the opportunity seekers.
Figure 22B:
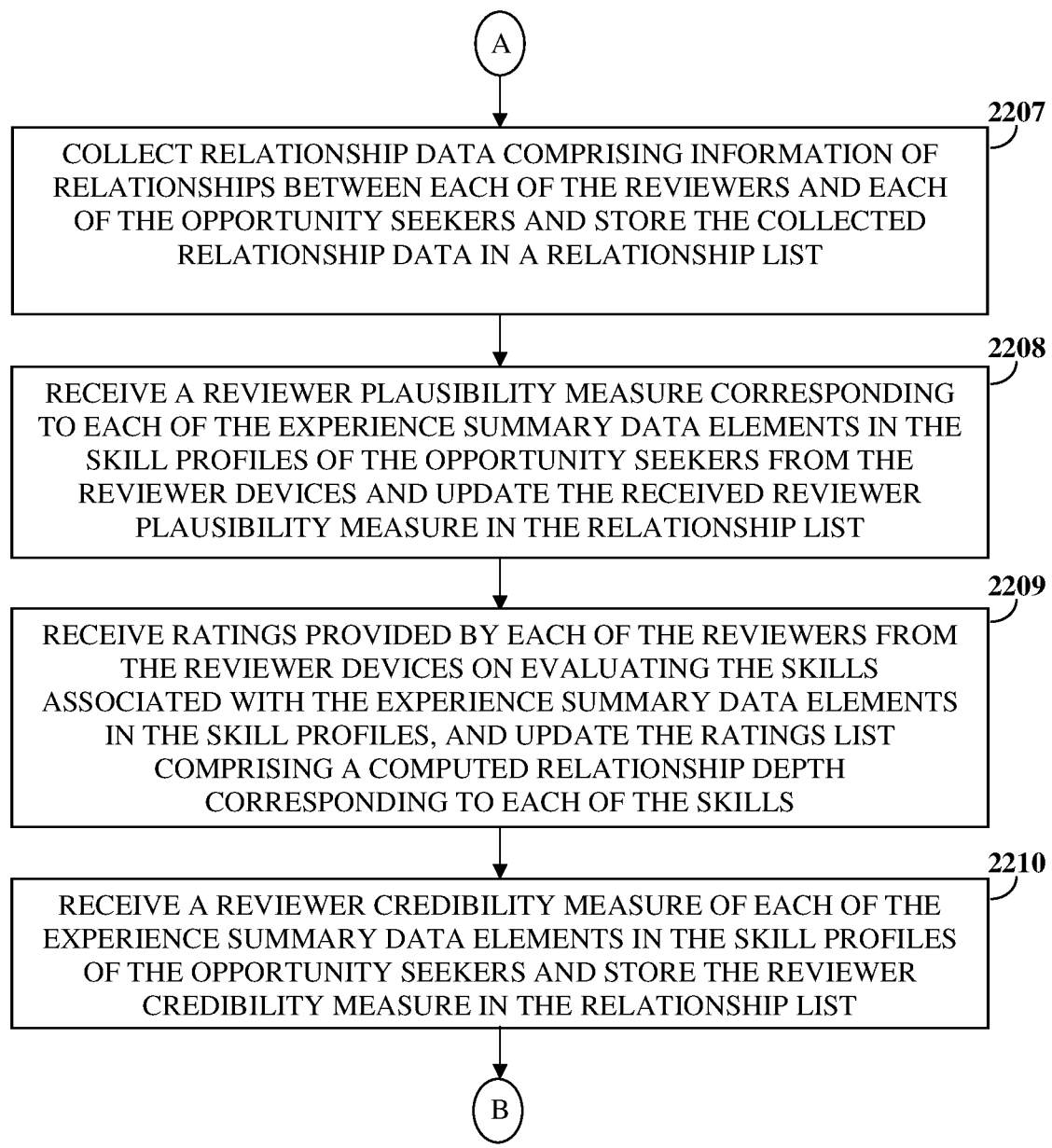
Figure 22C:
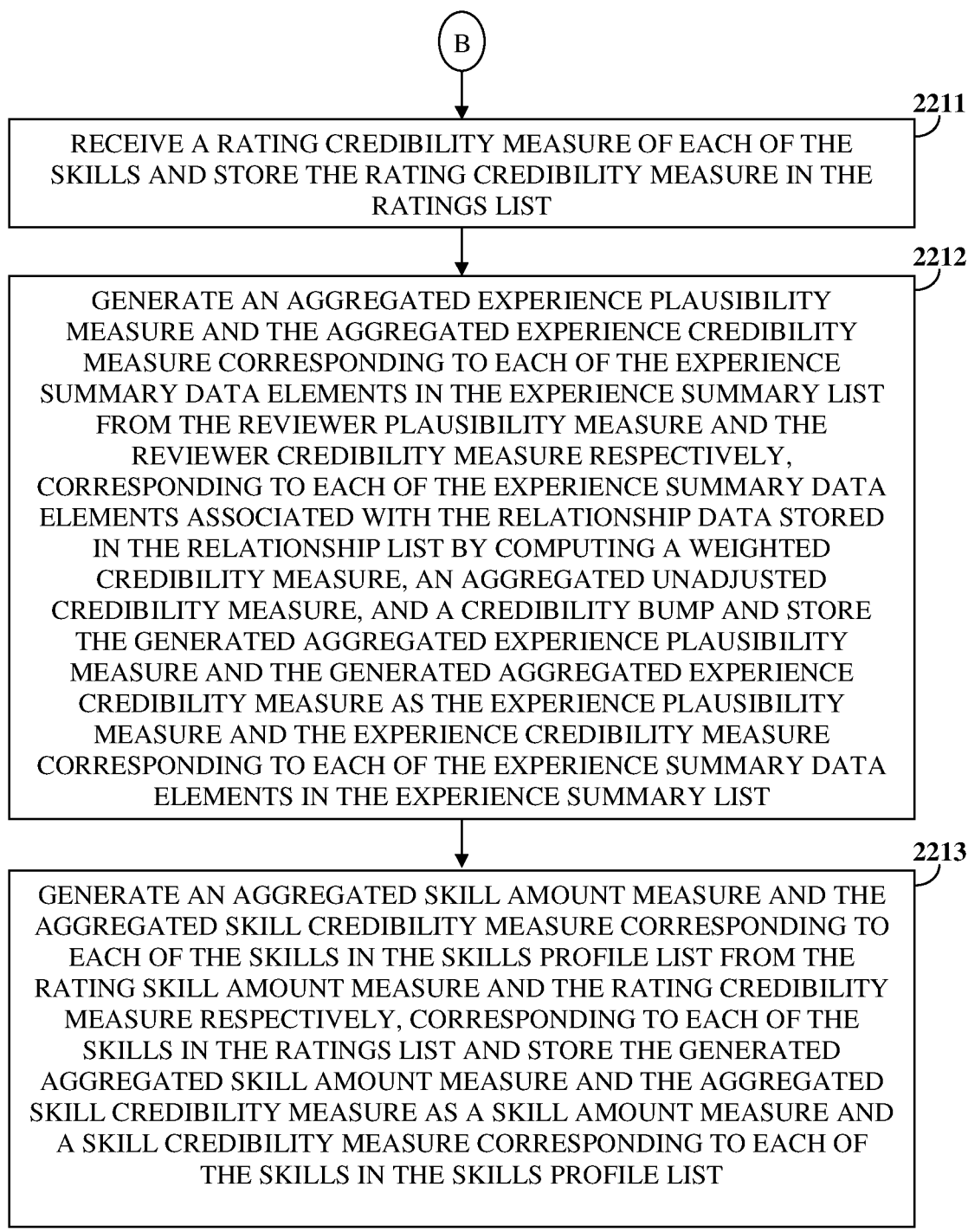

FIGS. 22A-22C exemplarily illustrates a method for determining credibility of experience ratings provided by one or more reviewers and discovering skills of opportunity seekers based on a relationship between the reviewers and the opportunity seekers. The method disclosed herein employs an experience rating and skill discovery system (ERSDS) 100 comprising at least one processor 107 configured to execute computer program instruction for determining credibility of experience ratings provided by one or more reviewers and discovering skills of opportunity seekers based on a relationship between the reviewers and the opportunity seekers as disclosed in detailed description of FIG. 1. The ERSDS 100 reads 2201 profile data of the opportunity seekers stored in a user profile list 301 exemplarily illustrated in FIG. 24. The ERSDS 100 generates 2202 a skills profile list 303 exemplarily illustrated in FIG. 25, comprising skill profiles associated with the opportunity seekers using the profile data and the skills selected from a predefined skill list 302 exemplarily illustrated in FIG. 23, via the seeker devices 102. The skill profiles comprise the skills of the opportunity seekers with corresponding skill amount measures and corresponding skill credibility measures indicating credibility of the skill amount measures. The ERSDS 100 receives 2203 an experience summary list 802 exemplarily illustrated in FIG. 26, comprising experience summary data elements in the skill profiles listed in the skills profile list 303 exemplarily illustrated in FIG. 25, of the opportunity seekers with corresponding experience plausibility measures and corresponding experience credibility measures. The ERSDS 100 transmits 2204 invitations to the reviewer devices 103 for evaluating the experience summary data elements in the received experience summary list 802 exemplarily illustrated in FIG. 26, and the skills of the opportunity seeker in the generated skills profile list 303 exemplarily illustrated in FIG. 25. The evaluation of the experience summary data elements and the skills of the opportunity seekers allow the reviewers to discover the skills possessed by an opportunity seeker in a skill profile associated with the experience summary data elements in the experience summary list 802.

The experience rating and skill discovery system (ERSDS) 100 determines 2205 whether profile data of the reviewers with the transmitted invitations is available in the user profile list 301 and receives and stores unavailable profile data of the reviewers with the transmitted invitations in the user profile list 301 exemplarily illustrated in FIG. 24. The ERSDS 100 configures 2206 a reviewer plausibility measure corresponding to each of the experience summary data elements in the skill profiles of the opportunity seekers in a relationship list 801 exemplarily illustrated in FIG. 27. The ERSDS 100 collects 2207 relationship data comprising information of relationships between each of the reviewers and each of the opportunity seekers and stores the collected relationship data in a relationship list 801. The ERSDS 100 receives 2208 a reviewer plausibility measure corresponding to each of the experience summary data elements in the skill profiles of the opportunity seekers from the reviewer devices 103 and updating the received reviewer plausibility measure in the relationship list 801, as disclosed in detailed description of FIG. 1.

The experience rating and skill discovery system (ERSDS) 100 receives 2209 ratings provided by each of the reviewers from the reviewer devices on evaluating said skills associated with the experience summary data elements in the skill profiles, and for updating the ratings list comprising a computed relationship depth corresponding to each of the skills. The ratings comprise a rating skill amount measure and a strength of belief measure for each of the skills. The computed relationship depth is a factor in computing an aggregated experience credibility measure corresponding to each of the experience summary data elements in the experience summary list 802 exemplarily illustrated in FIG. 26, and an aggregated skill credibility measure corresponding to each of the skills in the skills profile list. The ERSDS 100 receives 2210 a reviewer credibility measure of each of the experience summary data elements in the skill profiles of the opportunity seekers and stores the reviewer credibility measure in the relationship list 801. The reviewer credibility measure indicates credibility of the reviewer plausibility measure corresponding to each of the experience summary data elements in the skill profiles of the opportunity seekers. The ERSDS 100 receives 2211 a rating credibility measure of each of the skills and stores the rating credibility measure in the ratings list 803 exemplarily illustrated in FIG. 28. The rating credibility measure indicates credibility of the rating skill amount measure of each of the skills.

The experience rating and skill discovery system (ERSDS) 100 generates 2212 an aggregated experience plausibility measure and the aggregated experience credibility measure corresponding to each of the experience summary data elements in the experience summary list 802 exemplarily illustrated in FIG. 26, from the reviewer plausibility measure and the reviewer credibility measure respectively, corresponding to each of the experience summary data elements associated with the relationship data stored in said relationship list 801 by computing a weighted credibility measure, an aggregated unadjusted credibility measure, and a credibility bump and stores the generated aggregated experience plausibility measure and the generated aggregated experience credibility measure as the experience plausibility measure and the experience credibility measure corresponding to each of the experience summary data elements in the experience summary list 802 as disclosed in detailed description of FIG. 1. The ERSDS 100 generates 2213 an aggregated skill amount measure and the aggregated skill credibility measure corresponding to each of the skills of the opportunity seeker in the skills profile list 303 exemplarily illustrated in FIG. 25, from the rating skill amount measure and the rating credibility measure respectively, corresponding to each of the skills in the ratings list 803 exemplarily illustrated in FIG. 28, and stores the generated aggregated skill amount measure and the aggregated skill credibility measure as a skill amount measure and a skill credibility measure corresponding to each of the skills in the skills profile list 303 as disclosed in detailed description of FIG. 1. The generated aggregated skill credibility measure and the generated aggregated experience credibility measure determine credibility of experience ratings provided by the reviewers on evaluating the experience summary data elements and the skills associated with each of the opportunity seekers as disclosed in detailed description of FIG. 1.

The computer program codes embodied in the non-transitory computer readable storage medium comprise a first computer program code for reading profile data of the opportunity seekers stored in a user profile list; a second computer program code for generating a skills profile list comprising skill profiles associated with the opportunity seekers using the profile data and the skills selected from a predefined skill list via the seeker devices, wherein the skill profiles comprise the skills with corresponding skill amount measures and corresponding skill credibility measures indicating credibility of the skill amount measures; a third computer program code for receiving an experience summary list comprising experience summary data elements in the skill profiles of the opportunity seekers with corresponding experience plausibility measures and corresponding experience credibility measures; a fourth computer program code for transmitting invitations to the reviewer devices for evaluating said experience summary data elements in the received experience summary list and the skills of the opportunity seekers in said generated skills profile list, thereby allowing the reviewers to discover the skills possessed by an opportunity seeker in a skill profile associated with said experience summary data elements in said experience summary list; a fifth computer program code for determining whether profile data of the reviewers with the transmitted invitations is available in the user profile list and receiving and storing unavailable profile data of the reviewers with the transmitted invitations in the user profile list; a sixth computer program code for configuring a reviewer plausibility measure corresponding to each of the experience summary data elements in the skill profiles of the opportunity seekers in a relationship list; a seventh computer program code for collecting relationship data comprising information of relationships between each of the one or more reviewers and each of the opportunity seekers and storing the collected relationship data in a relationship list; a eighth computer program code for receiving a reviewer plausibility measure corresponding to each of the experience summary data elements in the skill profiles of the opportunity seekers from the reviewer devices and updating the received reviewer plausibility measure in the relationship list; a ninth computer program code for receiving ratings provided by each of the reviewers from the reviewer devices on evaluating said skills associated with the experience summary data elements in the skill profiles, and for updating the ratings list comprising a computed relationship depth corresponding to each of the skills, wherein the ratings comprise a rating skill amount measure and a strength of belief measure for each of the skills, and wherein the computed relationship depth computed is a factor in computing an aggregated experience credibility measure corresponding to each of the experience summary data elements in the experience summary list and an aggregated skill credibility measure corresponding to each of the skills in the skills profile list; a tenth computer program code for receiving a reviewer credibility measure of each of the experience summary data elements in the skill profiles of the opportunity seekers and storing said reviewer credibility measure in the relationship list, wherein the reviewer credibility measure indicates credibility of said reviewer plausibility measure corresponding to each of the experience summary data elements in the skill profiles of the opportunity seekers; a eleventh computer program code for receiving a rating credibility measure of each of the skills of the opportunity seekers and storing said rating credibility measure in the ratings list, wherein the rating credibility measure indicates credibility of said rating skill amount measure of each of the skills; a twelfth computer program code for generating an aggregated experience plausibility measure and the aggregated experience credibility measure corresponding to each of the experience summary data elements in the experience summary list from the reviewer plausibility measure and the reviewer credibility measure respectively, corresponding to each of the experience summary data elements associated with the relationship data stored in the relationship list by computing a weighted credibility measure, an aggregated unadjusted credibility measure, and a credibility bump and storing the generated aggregated experience plausibility measure and the generated aggregated experience credibility measure as the experience plausibility measure and the experience credibility measure corresponding to the each of said experience summary data elements in the experience summary list; and a thirteenth computer program code for generating an aggregated skill amount measure and the aggregated skill credibility measure corresponding to each of the skills of the opportunity seeker in the skills profile list from the rating skill amount measure and the rating credibility measure respectively, corresponding to each of the skills in the ratings list and storing said generated aggregated skill amount measure and the aggregated skill credibility measure as a skill amount measure and a skill credibility measure corresponding to each of the skills in the skills profile list, wherein the generated aggregated skill credibility measure and the generated aggregated experience credibility measure determine credibility of experience ratings provided by the reviewers on evaluating the experience summary data elements and the skills associated with each of the opportunity seekers.

The computer program codes further comprise a fourteenth computer program code for receiving profile data of one of the reviewers from the opportunity seeker, determining whether the profile data of the reviewers is available in the user profile list, and stores unavailable profile data of the reviewers in the user profile list. The non-transitory computer readable storage medium, wherein the skill is one of a personal trait and a domain of expertise of an opportunity seeker FIGS. 23-29 exemplarily illustrate tabular representations for determining credibility of experience ratings provided by one or more reviewers, that is, the rating users and discovering skills of opportunity seekers, that is, the rated users based on a relationship between the reviewers and the opportunity seekers. FIG. 23 exemplarily illustrates the predefined skill list 302 comprising skills classified into personal traits and domains of expertise. The skills are indicated by an ISTRAIT flag and the value of the ISTRAIT flag is TRUE for the personal traits and the value of the ISTRAIT flag is FALSE for the domains of expertise. As exemplarily illustrated in FIG. 23, the skill DEPENDABILITY is a personal trait indicated by TRUE and hypertext markup language (HTML) is a domain of expertise indicated by FALSE.

FIG. 24 exemplarily illustrates the user profile list 301 comprising profile data of users of the experience rating and skill discovery system (ERSDS) 100, that is, the opportunity seekers and the reviewers. The profile data comprises USER_IDs of the users, first names of the users, last names of the users, and electronic mail (email) addresses of the users. For example, a user is identified with a USER_ID FNERK, FRED as the first name, NERK as the last name, and fnerk@nerkworld.com as the email address of the user as exemplarily illustrated in FIG. 24. The user FNERK can be an opportunity seeker or a reviewer.

FIG. 25 exemplarily illustrates the skills profile list 303 generated by the skill profile module 108a of the experience rating and skill discovery system (ERSDS) 100 exemplarily illustrated in FIG. 1, using the profile data in the user profile list 301 exemplarily illustrated in FIG. 24 and the skills in the predefined skill list 302 exemplarily illustrated in FIG. 23. The skills profile list 303 comprises skill profiles. Each skill profile comprises an skill with a corresponding skill profile name SKILL PROFILE NAME, a corresponding skill amount measure AMOUNT PRESENT MEASURE, and a corresponding skill credibility measure SKILL CREDIBILITY MEASURE indicating credibility of the skill amount measure. As exemplarily illustrated in FIG. 25, the skills possessed by an opportunity seeker with the USER_ID FNERK in a skill profile with a skill profile name, for example, CLAIM MANAGEMENT, is provided with NULL values for the skill amount measure and the skill credibility measure.

FIG. 26 exemplarily illustrates the experience summary list 802 received by the user association module 108b exemplarily illustrated in FIG. 8. The experience summary list 802 comprises experience summary data sets identified by the EXP_ID. The experience summary data sets comprise the USER_ID of each of the opportunity seekers, that is, the rated users in the skill profiles, skill profile names SKILL PROFILE NAME, corresponding experience plausibility measures, and corresponding experience credibility measures. Each experience summary data set identified by the EXP_ID has a start date START_DATE and an end date END_DATE. For example, the opportunity seeker with the USER_ID FNERK has held a position of a claim management intern at a T.Y.K.E.S Resource Center at Chino, Calif. in the past from a start date Jun. 1, 2014 till Dec. 24, 2014 as exemplarily illustrated in FIG. 26. As a part of the responsibility in the position of a claim management intern, the opportunity seeker has assessed need and recommended services for diverse families with children birth to five years of age and has also co-lead the facilitation of court mandated parenting classes. The position held and the responsibilities in the position constitute an experience summary data element in the experience summary data set identified by the EXP_ID as 1. As exemplarily illustrated in FIG. 26, the experience plausibility measure and the experience credibility measure have NULL values.

FIG. 27 exemplarily illustrates a relationship list 801 comprising relationship data, a reviewer plausibility measure, and a reviewer credibility measure of each of the experience summary data sets listed in the experience summary list 802 exemplarily illustrated in FIG. 26. The relationship data comprises information of the relationships identified by the REL_ID between the reviewers identified by the RATING USER_ID and the opportunity seekers identified by the RATED USER_ID, and the experience summary data element of the experience summary data set identified by the EXP_ID being evaluated by the reviewer. As exemplarily illustrated in FIG. 27, the opportunity seeker identified by FNERK and the reviewer identified by DFELLA have a relationship identified by the REL_ID as 1 for an experience summary data set identified by the EXP_ID as 2. From the seeker devices 102 and the reviewer devices 103, the user association module 108b and the rating module 108d exemplarily illustrated in FIG. 1 collect information about the relationship and store the collected information in the relationship list 801. The user association module 108b and the rating module 108d configure NULL values for the reviewer plausibility measure and the relationship depth respectively, corresponding to the relationship identified by the REL_ID as 1.

FIG. 28 exemplarily illustrates a ratings list 803 comprising ratings and relationship depths corresponding to the skills, generated by the user association module 108b exemplarily illustrated in FIG. 8, of the experience rating and skill discovery system (ERSDS) 100. An opportunity seeker, that is, a rating user in a relationship identified by the REL_ID with a reviewer, that is, a rated user associated with an experience summary data element in the experience summary data set identified by the EXP_ID awards a rating skill amount measure AMOUNT_PRESENT and a strength of belief measure STRENGTH OF BELIEF for each of the o skills associated with the experience summary data element. The relationship measurement module 239 exemplarily illustrated in FIG. 15, computes the relationship depth RELATIONSHIP DEPTH corresponding to each of the skills possessed by the opportunity seeker and the rating module 108d exemplarily illustrated in FIG. 1, and stores the relationship depth in the ratings list 803. In an example, in a relationship identified by the REL_ID as 1, the reviewer identified by DFELLA rates the opportunity seeker identified by FNERK for each of the skills such as tutoring, Microsoft® Word, etc., possessed by FNERK in the experience summary data element of the experience summary data set identified by the EXP_ID as 2, as exemplarily illustrated in FIG. 28. The rating module 108d configures NULL values for the rating skill amount measure and the strength of belief measure. The reviewer DFELLA provides the rating skill amount measure and the strength of belief measure from the reviewer device. The relationship measurement module 239 computes the relationship depth of the relationship between the opportunity seeker and the reviewer with regard to the skill. The credibility module 240 exemplarily illustrated in FIG. 16, computes the rating credibility measure and the rating module 108d stores the computed rating credibility measure corresponding to skills possessed by FNERK in the experience summary data element of the experience summary data set identified by the EXP_ID as 2 in the ratings list 803.

For the N reviewer credibility measures received from the credibility module 240 in the relationship list 801 exemplarily illustrated in FIG. 27, the aggregation module 108e generates an aggregated experience plausibility measure and an aggregated experience credibility measure from the reviewer plausibility measures and the reviewer credibility measures respectively, per rating user using the measure aggregator 246 exemplarily illustrated in FIGS. 18-19 and FIG. 21. For the N ratings comprising rating credibility measures received from the credibility module 240 in the ratings list 803 exemplarily illustrated in FIG. 28, the aggregation module 108e using the measure aggregator 246 generates an aggregated skill amount measure and an aggregated skill credibility measure entered per rating user for each of the skills. The aggregation module 108e invokes the measure aggregator 246 twice. The aggregation module 108e updates the aggregated experience plausibility measure and the aggregated experience credibility measure as the experience plausibility measure and the experience credibility measure respectively, in the experience summary list 802 exemplarily illustrated in FIG. 26. The aggregation module 108e further updates the aggregated skill amount measure and the aggregated skill credibility measure as the skill amount measure and the skill credibility measure respectively, corresponding to each of the skills in the skills profile list 303 exemplarily illustrated in FIG. 25.

FIG. 29 exemplarily illustrates a user profile list 301 comprising profile data of at least one user, that is, an opportunity seeker or a reviewer, stored in a database of the experience rating and skill discovery system (ERSDS) 100. The user profile list 301 is populated by the skill profile module 108a exemplarily illustrated in FIG. 1, as the skill profile module 108a receives first names, last names, and electronic mail addresses of the users from the seeker devices and the reviewer devices.

FIG. 30 exemplarily illustrates the experience summary list 802 comprising at least one experience summary data set received from the seeker devices 102 of the opportunity seekers, stored in a database of the experience rating and skill discovery system (ERSDS) 100. The user association module 108b exemplarily illustrated in FIG. 1, receives the experience summary list 802 comprising experience summary data elements received from the opportunity seekers via the seeker devices 102.

The foregoing examples have been provided merely for explanation and are in no way to be construed as limiting of the experience rating and skill discovery system (ERSDS) 100 and the method disclosed herein. While the ERSDS 100 and the method have been described with reference to various embodiments, it is understood that the words, which have been used herein, are words of description and illustration, rather than words of limitation. Furthermore, although the ERSDS 100 and the method have been described herein with reference to particular means, materials, and embodiments, the ERSDS 100 and the method are not intended to be limited to the particulars disclosed herein; rather, the ERSDS 100 and the method extend to all functionally equivalent structures, methods and uses, such as are within the scope of the appended claims. While multiple embodiments are disclosed, it will be understood by those skilled in the art, having the benefit of the teachings of this specification, that the ERSDS 100 and the method disclosed herein are capable of modifications and other embodiments may be effected and changes may be made thereto, without departing from the scope and spirit of the ERSDS 100 and the method disclosed herein.

We claim:

1. An experience rating and skill discovery system comprising:
   at least one web computer server rendering a graphical user interface on a plurality of seeker devices and reviewer devices;
   at least one database server communicatively coupled to said at least one web computer server via a network, said at least one database server hosting one or more databases for storing a user profile list, a generated skills profile list, a predefined skill list, an experience summary list, a relationship list, and a ratings list; and
   at least one processing computer server comprising at least one processor communicatively coupled to said at least one web computer server, said at least one database server, said plurality of seeker devices, and said reviewer devices via said network, said at least one processor configured to execute computer program instructions defined by modules of said experience rating and skill discovery system, said modules of said experience rating and skill discovery system comprising:
   a skill profile module for reading profile data of opportunity seekers stored in said user profile list;
   said skill profile module for generating said skills profile list comprising skill profiles associated with said opportunity seekers, using said stored profile data and skills selected by said opportunity seekers from said predefined skill list via said plurality of seeker devices, said skill profiles associated with said opportunity seekers comprising skills associated with said opportunity seekers with corresponding skill amount measures and corresponding skill credibility measures indicating credibility of said skill amount measures;
   a user association module for receiving said experience summary list comprising experience summary data elements in said skill profiles associated with said opportunity seekers with corresponding experience plausibility measures and corresponding experience credibility measures, from said at least one database server;
   an invitation module for transmitting invitations to said reviewer devices for evaluating said experience summary data elements in said received experience summary list and said skills in said generated skills profile list, thereby allowing one or more reviewers to discover said skills associated with said opportunity seekers in a skill profile associated with said experience summary data elements in said experience summary list;
   said user association module for determining whether profile data of each of said one or more reviewers with said transmitted invitations is available in said user profile list;
   said user association module for configuring in said relationship list a reviewer plausibility measure corresponding to each of said experience summary data elements in said skill profiles of said opportunity seekers;
   said user association module for collecting relationship data comprising information of relationships between each of said one or more reviewers and each of said opportunity seekers and storing said collected relationship data in said relationship list;
   said rating module for receiving said reviewer plausibility measure corresponding to each of said experience summary data elements in said skill profiles of said opportunity seekers from said reviewer devices and updating in said relationship list said received reviewer plausibility measure corresponding to each of said experience summary data elements in said skill profiles of said opportunity seekers;
   said rating module for receiving ratings provided by said each of said one or more reviewers from said reviewer devices on evaluating said skills associated with said experience summary data elements in said skill profiles associated with said opportunity seekers, and for updating said ratings list comprising a computed relationship depth corresponding to each of said skills, wherein said ratings comprise a rating skill amount measure and a strength of belief measure for each of said skills, and wherein said computed relationship depth computed by a relationship measurement module of an external operational system is a factor in computing an aggregated experience credibility measure corresponding to said each of said experience summary data elements in said experience summary list and an aggregated skill credibility measure corresponding to said each of said skills in said generated skills profile list;

said rating module for receiving a reviewer credibility measure of said each of said experience summary data elements in said skill profiles associated with said opportunity seekers, from a credibility module of said external operational system, and storing said reviewer credibility measure in said relationship list, wherein said reviewer credibility measure computed by said credibility module of said external operational system is indicative of credibility of said reviewer plausibility measure corresponding to said each of said experience summary data elements in said skill profiles associated with said opportunity seekers;

said rating module for receiving a rating credibility measure of said each of said skills from said credibility module, and storing said rating credibility measure in said ratings list, wherein said rating credibility measure computed by said credibility module indicates credibility of said rating skill amount measure of said each of said skills;

an aggregation module for generating an aggregated experience plausibility measure and said aggregated experience credibility measure corresponding to said each of said experience summary data elements in said experience summary list, from said updated reviewer plausibility measure and said reviewer credibility measure respectively, corresponding to said each of said experience summary data elements associated with said relationship data stored in said relationship list, by computing a weighted credibility measure, an aggregated unadjusted credibility measure, and a credibility bump, and storing said generated aggregated experience plausibility measure and said generated aggregated experience credibility measure as said experience plausibility measure and said experience credibility measure corresponding to said each of said experience summary data elements in said experience summary list; and said aggregation module for generating an aggregated skill amount measure and said aggregated skill credibility measure corresponding to said each of said skills in said generated skills profile list, from said rating skill amount measure and said rating credibility measure respectively, corresponding to said each of said skills in said ratings list, and storing said generated aggregated skill amount measure and said aggregated skill credibility measure as a skill amount measure and a skill credibility measure corresponding to said each of said skills in said generated skills profile list, wherein said generated aggregated skill credibility measure and said generated aggregated experience credibility measure determine credibility of experience ratings provided by said one or more reviewers on evaluating said experience summary data elements and said skills associated with said opportunity seekers.

2. The experience rating and skill discovery system of claim 1, wherein said user association module receives and stores profile data of said one or more reviewers with said transmitted invitations from said opportunity seeker when said profile data of said one or more reviewers is unavailable in said user profile list.

3. The experience rating and skill discovery system of claim 1, wherein said skills associated with said opportunity seekers comprise one of a personal trait and a domain of expertise of said opportunity seekers.

4. A method employing an experience rating and skill discovery system comprising at least one processor, said method comprising:

reading profile data of opportunity seekers stored in a user profile list by said experience rating and skill discovery system;

generating a skills profile list comprising skill profiles associated with said opportunity seekers using said profile data and skills selected by said opportunity seekers from a predefined skill list via a plurality of seeker devices, by said experience rating and skill discovery system, wherein said skill profiles associated with said opportunity seekers comprise skills associated with said opportunity seekers with corresponding skill amount measures and corresponding skill credibility measures indicating credibility of said skill amount measures;

receiving an experience summary list comprising experience summary data elements in said skill profiles associated with said opportunity seekers with corresponding experience plausibility measures and corresponding experience credibility measures, by said experience rating and skill discovery system;

transmitting invitations to a plurality of reviewer devices for evaluating said experience summary data elements in said received experience summary list and said skills in said generated skills profile list, by said experience rating and skill discovery system, thereby allowing one or more reviewers to discover said skills associated with said opportunity seekers in a skill profile associated with said experience summary data elements in said experience summary list;

determining whether profile data of said one or more reviewers with said transmitted invitations is available in said user profile list, by said experience rating and skill discovery system;

configuring in said relationship list a reviewer plausibility measure corresponding to each of said experience summary data elements in said skill profiles associated with said opportunity seekers, by said experience rating and skill discovery system;

collecting relationship data comprising information of relationships between each of said one or more reviewers and each of said opportunity seekers and storing said collected relationship data in a relationship list, by said experience rating and skill discovery system;

receiving said reviewer plausibility measure corresponding to each of said experience summary data elements in said skill profiles associated with said opportunity seekers from said reviewer devices and updating in said relationship list said received reviewer plausibility measure corresponding to each of said experience summary data elements in said skill profiles associated with said opportunity seekers, by said experience rating and skill discovery system;

receiving ratings provided by said each of said one or more reviewers from said reviewer devices on evaluating said skills associated with said experience summary data elements in said skill profiles associated with said opportunity seekers, and updating said ratings list comprising a computed relationship depth corresponding to each of said skills, by said experience rating and skill discovery system, wherein said ratings comprise a rating skill amount measure and a strength of belief measure for each of said skills, and wherein said computed relationship depth is a factor in computing an aggregated experience credibility measure corresponding to said each of said experience summary data elements in said experience summary list and an aggregated skill credibility measure corresponding to said each of said skills in said generated skills profile list;

receiving a reviewer credibility measure of said each of said experience summary data elements in said skill profiles associated with said opportunity seekers and storing said reviewer credibility measure in said relationship list, by said experience rating and skill discovery system, wherein said reviewer credibility measure is indicative of credibility of said reviewer plausibility measure corresponding to said each of said experience summary data elements in said skill profiles associated with said opportunity seekers;

receiving a rating credibility measure of said each of said skills and storing said rating credibility measure in said ratings list, by said experience rating and skill discovery system, wherein said rating credibility measure indicates credibility of said rating skill amount measure of said each of said skills;

generating an aggregated experience plausibility measure and said aggregated experience credibility measure corresponding to said each of said experience summary data elements in said experience summary list from said updated reviewer plausibility measure and said reviewer credibility measure respectively, by said experience rating and skill discovery system, corresponding to said each of said experience summary data elements associated with said relationship data stored in said relationship list by computing a weighted credibility measure, an aggregated unadjusted credibility measure, and a credibility bump and storing said generated aggregated experience plausibility measure and said generated aggregated experience credibility measure as said experience plausibility measure and said experience credibility measure corresponding to said each of said experience summary data elements in said experience summary list; and generating an aggregated skill amount measure and said aggregated skill credibility measure corresponding to said each of said skills in said generated skills profile list from said rating skill amount measure and said rating credibility measure respectively, by said experience rating and skill discovery system, corresponding to said each of said skills in said ratings list and storing said generated aggregated skill amount measure and said aggregated skill credibility measure as a skill amount measure and a skill credibility measure corresponding to said each of said skills in said generated skills profile list, wherein said generated aggregated skill credibility measure and said generated aggregated experience credibility measure determine credibility of experience ratings provided by said one or more reviewers on evaluating said experience summary data elements and said skills associated with said opportunity seekers.

5. The method of claim 4, further comprising:
receiving and storing said profile data of said one or more reviewers with said transmitted invitations from said opportunity seeker when said profile data of said one or more reviewers is unavailable in said user profile list, by said experience rating and skill discovery system.

6. The method of claim 4, wherein said skills associated with said opportunity seekers comprise one of a personal trait and a domain of expertise of said opportunity seekers.

7. A non-transitory computer readable storage medium having embodied thereon, computer program codes comprising instructions executable by at least one processor, said computer program codes comprising:

a first computer program code for reading profile data of opportunity seekers stored in a user profile list;

a second computer program code for generating a skills profile list comprising skill profiles associated with said opportunity seekers using said profile data and skills selected by said opportunity seekers from a predefined skill list via a plurality of seeker devices, wherein said skill profiles associated with said opportunity seekers comprise skills associated with said opportunity seekers with corresponding skill amount measures and corresponding skill credibility measures indicating credibility of said skill amount measures;

a third computer program code for receiving an experience summary list comprising experience summary data elements in said skill profiles associated with said opportunity seekers with corresponding experience plausibility measures and corresponding experience credibility measures;

a fourth computer program code for transmitting invitations to a plurality of reviewer devices for evaluating said experience summary data elements in said received experience summary list and said skills in said generated skills profile list, thereby allowing one or more reviewers to discover said skills associated with said opportunity seeker in a skill profile associated with said experience summary data elements in said experience summary list;

a fifth computer program code for determining whether profile data of said one or more reviewers with said transmitted invitations is available in said user profile list;

a sixth computer program code for configuring in said relationship list a reviewer plausibility measure corresponding to each of said experience summary data elements in said skill profiles of said opportunity seekers;

a seventh computer program code for collecting relationship data comprising information of relationships between each of said one or more reviewers and each of said opportunity seekers and storing said collected relationship data in a relationship list;

an eighth computer program code for receiving a reviewer plausibility measure corresponding to each of said experience summary data elements in said skill profiles associated with said opportunity seekers from said reviewer devices and updating in said relationship list said received reviewer plausibility measure corresponding to each of said experience summary data elements in said skill profiles associated with said opportunity seekers;

a ninth computer program code for receiving ratings provided by said each of said one or more reviewers from said reviewer devices on evaluating said skills associated with said experience summary data elements in said skill profiles associated with said opportunity seekers, and updating said ratings list comprising a computed relationship depth corresponding to each of said skills, wherein said ratings comprise a rating skill amount measure and a strength of belief measure for each of said skills, and wherein said computed relationship depth computed is a factor in computing an aggregated experience credibility measure corresponding to said each of said experience summary data elements in said experience summary list and an aggregated skill credibility measure corresponding to said each of said skills in said generated skills profile list;

a tenth computer program code for receiving a reviewer credibility measure of said each of said experience summary data elements in said skill profiles associated with said opportunity seekers and storing said reviewer credibility measure in said relationship list, wherein said reviewer credibility measure is indicative of credibility of said reviewer plausibility measure corresponding to said each of said experience summary data elements in said skill profiles associated with said opportunity seekers;

an eleventh computer program code for receiving a rating credibility measure of said each of said skills and storing said rating credibility measure in said ratings list, wherein said rating credibility measure indicates credibility of said rating skill amount measure of said each of said skills;

a twelfth computer program code for generating an aggregated experience plausibility measure and said aggregated experience credibility measure corresponding to said each of said experience summary data elements in said experience summary list, from said updated reviewer plausibility measure and said reviewer credibility measure respectively, corresponding to said each of said experience summary data elements associated with said relationship data stored in said relationship list by computing a weighted credibility measure, an aggregated unadjusted credibility measure, and a credibility bump and storing said generated aggregated experience plausibility measure and said generated aggregated experience credibility measure as said experience plausibility measure and said experience credibility measure corresponding to said each of said experience summary data elements in said experience summary list; and a thirteenth computer program code for generating an aggregated skill amount measure and said aggregated skill credibility measure corresponding to said each of said skills in said generated skills profile list from said rating skill amount measure and said rating credibility measure respectively, corresponding to said each of said skills in said ratings list and storing said generated aggregated skill amount measure and said aggregated skill credibility measure as a skill amount measure and a skill credibility measure corresponding to said each of said skills in said generated skills profile list, wherein said generated aggregated skill credibility measure and said generated aggregated experience credibility measure determine credibility of experience ratings provided by said one or more reviewers on evaluating said experience summary data elements and said skills associated with said opportunity seekers.

8. The non-transitory computer readable storage medium of claim 7, further comprising a fourteenth computer program code for receiving and storing said profile data of said one or more reviewers with said transmitted invitations from said opportunity seeker when said profile data of said one or more reviewers is unavailable in said user profile list.

9. The non-transitory computer readable storage medium of claim 7, wherein said skills associated with said opportunity seekers comprise one of a personal trait and a domain of expertise of said opportunity seekers.

* * * * *